United States Patent
Chaudhary et al.

(10) Patent No.: US 6,325,956 B2
(45) Date of Patent: *Dec. 4, 2001

(54) CROSSLINKING OF POLYMERS AND FOAMS THEREOF

(75) Inventors: Bharat I. Chaudhary, Pearland; Thoi H. Ho, Lake Jackson; Seema V. Karande, Lake Jackson; Che-I. Kao, Lake Jackson, all of TX (US); Robert H. Terbrueggen, South Pasadena, CA (US); David A. Babb, Lake Jackson, TX (US); Clark H. Cummins, Midland, MI (US); Michael J. Mullins, Lake Jackson, TX (US); H. Craig Silvis, Midland, MI (US)

(73) Assignee: The Dow Chemical Company, Midland, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,004

(22) Filed: Aug. 26, 1998

Related U.S. Application Data

(60) Provisional application No. 60/057,688, filed on Aug. 27, 1997.

(51) Int. Cl.$^7$ .............................. B29C 44/02; B29C 44/20

(52) U.S. Cl. ............................ 264/50; 264/54; 264/138; 264/176.1; 264/320; 264/328.1

(58) Field of Search .................................. 264/54, 51, 50, 264/138, 500, 320, 328.1, 176.1

(56) References Cited

U.S. PATENT DOCUMENTS

| | | |
|---|---|---|
| 3,058,944 | 10/1962 | Breslow et al. . |
| 3,203,936 | 8/1965 | Breslow et al. . |
| 3,203,937 | 8/1965 | Breslow et al. . |
| 3,282,864 | 11/1966 | Best et al. . |
| 3,298,975 | 1/1967 | Feild et al. . |

(List continued on next page.)

FOREIGN PATENT DOCUMENTS

| | | |
|---|---|---|
| 797917 | 10/1968 | (CA) . |
| 1024296 | 1/1978 | (CA) . |
| 1 569 025 | 3/1964 | (DE) . |
| 0 702 032 A2 | 3/1996 | (EP) . |
| 1080619 | 8/1967 | (GB) . |
| 2 205 103 A | 11/1988 | (GB) . |
| 46/31756 | 9/1971 | (JP) . |
| 50-133248 | 10/1975 | (JP) . |
| 96/07681 | 3/1996 | (WO) . |

OTHER PUBLICATIONS

L. Gonzales Hernandez, J.L. Benito Gonzales, L. Ibarra Rueda, and A. Rodriguez Diaz, "Effect of Different Cross–Linking Systems on Properties of Highly Saturated Nitrile Rubber Compounds", *Journal Applied Polymer Science*, vol. 54, pp. 1073–1078 (1994).

H. Radusch, J. Ding, and M. Schulz, "Chemical coupling of polystyrene and polybutadiene in melt mixtures by using an organic sulfonylazide", *Die Angewandte Makromolekulare Chemie*, vol. 204, pp. 177–189, (1993).

N. Takashima, Y. Nakayama, "The Processings of Crosslinked Plastics", *Kogaku Kogyo (Chemical Industry)*, pp. 34(378)–39(383), (1969).

D. S. Breslow, M. F. Sloan, N. R. Newburg, and W. B. Renfrow, "Thermal Reactions of Sulfonyl Azides", *J. Amer. Chem. Soc.*, vol. 91, pp. 2273–9 (1969).

Derwent Chemical Abstract No. 77–02552Y of JP 51134762 A (Undated).

J.L. de Benito Gonzalez, L. Ibarra Rueda, and L. Gonzalez Hernandez, "The Use of Benzene 1,3–Sulphonyl Azide as in Elastomer Crosslinking Agent", *Kautschuk+Gummi, Kunstsoffe 43. Jahgang, Nr.*, pp. 146–149, (1990).

M. Xanthos, "Interfacial Agents for Multiphase Polymer Systems: Recent Advances", *Polymer Engineering and Science*, vol. 28, No. 21, pp. 1392–1400, (1988).

R. A. Abramovitch, "Polar Radicals in Aromatic Substitution", *Intra–Science Chemistry Reports*, pp. 211–218, (1969).

R. A. Abramovitch, G. N. Knaus, M. Pavlin, and W. D. Holcomb, "Reaction of Sulphonyl Azides with Unstrained Olefins", *J. Chem. Soc.*, pp. 2169–2172, (1974).

(List continued on next page.)

*Primary Examiner*—Allan R. Kuhns

(57) ABSTRACT

The invention includes a process comprising (a) forming a polymeric admixture including at least one polyolefin which has been prepared using a single site catalyst and at least a crosslinking amount of at least one poly(sulfonyl azide) crosslinking agent; (b) shaping the resulting admixture; and (c) heating the resulting shaped admixture to a temperature at least the decomposition temperature of the crosslinking agent. The steps take place in any sequence and optionally include substeps. The single site catalyst is preferably a constrained geometry or metallocene catalyst, but optionally another transition metal catalyst which is not a traditional Ziegler Natta Ti/MgCl$_2$ catalyst such as a vanadium catalyst. The invention further includes all compositions obtainable by the process of the invention as well as all articles formed from these compositions. The articles are preferably thermoformed, compression molded, injection molded, extruded, cast, blow molded, blown, profile extruded, spun, foamed or molded of any composition of the invention. The invention includes a use of any composition of the invention in any process of thermoforming, injection molding, extrusion, casting, blow molding, spinning, blowing, profile extrusion, foaming, compression molding or a combination thereof.

23 Claims, No Drawings

U.S. PATENT DOCUMENTS

| | | | |
|---|---|---|---|
| 3,336,268 | 8/1967 | Cox. | |
| 3,341,480 | 9/1967 | Feild et al.. | |
| 3,389,198 | 6/1968 | Taber. | |
| 3,507,829 | 4/1970 | Bostick et al.. | |
| 3,530,108 | 9/1970 | Oppenlander et al.. | |
| 3,583,939 | 6/1971 | Bostick et al.. | |
| 3,770,696 | 11/1973 | Bostick et al.. | |
| 3,855,184 | 12/1974 | Bostick et al.. | |
| 4,352,892 | 10/1982 | Lohmar. | |
| 4,579,905 | 4/1986 | Krabbenhoft. | |
| 4,694,025 | 9/1987 | Park. | |
| 4,714,716 | 12/1987 | Park. | |
| 5,037,895 | 8/1991 | Marker et al.. | |
| 5,288,762 | 2/1994 | Park et al. | 521/79 |
| 5,869,591 * | 2/1999 | McKay et al. | 526/347 |

OTHER PUBLICATIONS

R. A. Abramovitch, T. Chellathurai, W. D. Holcomb, I. T. McMaster, and D. P. Vanderpool, "Intramolecular Insertion of Arylsulfonylnitrenes into Aliphatic Side Chains[1]", *J. Org. Chem.*, vol. 42, No. 17, pp. 2020–2926, (1977).

R. A. Abramovitch, S. B. Hendi, and A. O. Kress, "Pyrolysis of Phenylalkylsulphonyl Azides and 2–phenethyl Azidoformate. Selectivity of Sulphonylnitrenes and Contrast between Sulphonyl–and Carbonyl–nitrenes", *J. Chem. Soc. Commun.*, pp. 1087–1088, (1981).

R. A. Abramovitch, M. Ortiz, and S. P. McManus, "Reaction of Aromatic Sulfonyl Azides with Dienes", *J. Org. Chem.*, vol. 46, pp. 330–335, (1981).

* cited by examiner

US 6,325,956 B2

CROSSLINKING OF POLYMERS AND FOAMS THEREOF

This application claims the benefit of Provisional Application No. 60/057,688, filed Aug. 27, 1997.

This invention relates to crosslinking of polyolefins, more specifically crosslinking of polyolefins using insertion into carbon hydrogen (C—H) bonds.

As used herein, the term "crosslinking" means forming bonds between polymer chains such that gels insoluble in xylene are formed to an extent of at least about 10 percent as measured according to ASTM 2765-84.

Polyolefins are frequently crosslinked using nonselective chemistries involving free radicals generated for instance using peroxides or high energy radiation. However, chemistries involving free radical generation at elevated temperatures also degrade the molecular weight, especially in polymers containing tertiary hydrogen such as polystyrene, polypropylene, polyethylene copolymers etc.

Other methods of crosslinking are also known.

The teachings of U.S. Pat. Nos. 3,058,944; 3,336,268; and 3,530,108 include the reaction of certain poly(sulfonyl azide) compounds with certain polyolefins.

It would be desirable to have a method of crosslinking, especially for polyolefins especially for those prepared using single site catalysts, more particularly for ethylene and its copolymers, most preferably of narrow molecular weight distribution (MWD), which avoids the chain scission effects of free radicals and more desirably also avoids the need for functional groups on polymers for reactive sites for crosslinking agents. Desirably the crosslinking me hod would be initiated by heat, more desirably the temperatures normally encountered in polymer processes within the skill in the art such as extrusion and other industrial heat processes for instance as disclosed by J. A. Brydson, Rubbery Materials and their Compounds, page 348, Chapter 18, Elsevier Applied Science, New York, 1988. (E.g. the decomposition temperature of the crosslinking agent is advantageously matched with melt temperature of polymer, such that the decomposition temperature is sufficiently high to be melt mixed and in a shaping step with precuring, and the decomposition temperature is advantageously sufficiently low to have a desirably short curing time in a curing step).

Which polymers, in the case of high density polyethylene especially when the polymer produced by single site catalysts, and preferably density greater than 0.945 g/ml) (hereinafter HDPE produced using single site catalysts), would desirably have a higher toughness, tensile and/or elongation than a crosslinked high density polyethylene prepared using Ziegler Natta catalyst (which would generally be of broader molecular weight distribution) the HDPE produced using single site catalysts crosslinked using the same equivalents of a free radical crosslinking agent. Advantageously, compositions would have less undesirable odor than the same starting material crosslinked using the same chemical equivalents of free radical generating agents. Preferably, a process of the invention would result in more consistent crosslinking than methods of crosslinking involving free radicals, that is use of the same reactants, amounts and conditions would result in consistent amounts of crosslinking or consistent (reproducible) property changes, especially consistent amounts of gel formation. Preferably, a process would be less subject to effects from the presence of oxygen than would a crosslinking involving agents which generate free radicals. Further, for a comparatively high melting polymer like HDPE (about 140° C.) it is desirable to avoid premature crosslinking during melt mixing process.

That is, desirably, a process would provide a broader processing window for crosslinking than is observed with peroxides.

In the case of, medium and lower density polyethylene (that is polymers having a density of from about 0.94 g/cc to about 0.90 g/cc), also produced using single site catalysts, which are advantageously copolymers of ethylene in which the percent comonomer is preferably about 0.5 to 5 mole percent comonomer based on total polymer as determined by ASTM 5017, the polymers would desirably show a combination of high upper service temperature performance (measured by the thermal mechanical analysis described hereinafter)

and creep resistance (measured according to ASTM-D-2990-77) as compared to non crosslinked polymer.

In the case of elastomeric polymers containing ethylene repeating units in which the preferred density less than about 0.89 g/mL and more preferably with a comonomer content greater than about 5, most preferably about 5–25 mole percent as determined by ASTM 5017, also produced using single site catalysts it would be desirable to have a better mechanical properties such as elongation and tensile, strength, and lower compression set than would be achieved by crosslinking using the same chemical equivalents of free radical generating agent like a peroxide. Desirably, the crosslinked material would have better organoleptic qualities, especially less foul odor, than the same starting material crosslinked using peroxides.

SUMMARY OF THE INVENTION

It has been discovered that crosslinking polyolefins using poly(sulfonyl azide) produces polymer products having surprisingly useful properties when the polyolefin has been prepared using a single site catalyst, such as a vanadium catalyst, a metallocene catalyst or a constrained geometry catalyst.

The invention includes a process comprising (a) forming a polymeric admixture including at least one polyolefin which has been prepared using a single site catalyst and at least a crosslinking amount of at least one poly(sulfonyl azide) crosslinking agent; (b) shaping the resulting admixture; and (c) heating the resulting shaped admixture to a temperature at least the decomposition temperature of the crosslinking agent. The steps take place in any sequence and optionally include substeps. Preferably in step (b) the polymeric admixture is in a softened or melted condition for shaping; or step (b) comprises thermoforming, compression molding, injection molding, extrusion, casting, blow molding, blowing, profile extrusion, spinning, other molding or combination thereof; or step (c) comprises foaming; or step (a) includes forming a foamable melt polymer material by admixing and heating a decomposable chemical blowing agent and other components of the polymeric admixture; and step (b) includes extruding the foamable melt polymer material through a die; or step (a) comprises the substeps of (i) suspending discrete polyolefin particles in a liquid medium in which they are insoluble, (ii) impregnating the particles with a crosslinking amount of poly(sulfonyl azide) crosslinking agent and a blowing agent at a superatmospheric pressure and temperature above the softening point of the polymer; and step (b), (c) or a combination thereof includes (iii) rapidly discharging the particles into a pressure less than that in substep (ii) to form foam beads or (iv) cooling the particles and subsequently expanding them with at least one heated gas; or step (a) includes admixing at least one polyolefin, a crosslinking amount of a poly(sulfonyl azide) crosslinking agent, and a chemical blowing agent to form an admixture; step (b) comprises a first substep forming a slab of the admixture; step (c) includes heating the admixture in a mold such that the crosslinking agent crosslinks the polymer material and the blowing agent decomposes; and either step (b), step (c) or a combination thereof includes expanding the slab formed in the first substep of step (b) by releasing pressure in the mold; or step (b) comprises a first substep of forming a sheet of the polymeric admixture containing a crosslinking amount of poly(sulfonyl azide) crosslinking agent; step (c) comprises heating the sheet sufficiently to result in crosslinking; step (b) further includes a second substep of impregnating the sheet with $N_2$ at a temperature above the softening point of the polymer and at a pressure and a third substep of releasing the pressure to result in nucleation of bubbles and some expansion in the sheet or a combination thereof. More preferably, the crosslinking agent is introduced into the polymeric admixture in melt processing equipment which is preferably an extruder. The single site catalyst is preferably a constrained geometry or metallocene catalyst, but optionally another transition metal catalyst which is not a traditional Ziegler Natta Ti/$MgCl_2$ catalyst such as a vanadium catalyst. At least one polyolefin is preferably a polyethylene homopolymer; an ethylene copolymer also having at least one alpha olefin comonomer selected from monomers of from 3 to 20 carbon atoms; an elastomeric polymer; an ethylene/alpha olefin/diene terpolymer or interpolymer; a substantially linear ethylene polymer or a combination thereof. At least one polyolefin preferably has a molecular weight distribution less than about 3.5; more preferably all of the polyolefins have that MWD. The polymeric admixture is preferably a blend comprising at least about 5 weight percent of least one polyolefin made using a single site catalyst and at least one other polymer which differs from the polyolefin by having a different density, a different molecular weight, a different catalyst used in polymerization, a different chemical composition or combination thereof. The polyolefin is made using single site catalyst and is preferably present in an amount of at least about 10 weight percent of the blend, is a polyethylene or an ethylene alpha olefin copolymer and the other polymer preferably differs in density, in molecular weight (Mn) by the larger molecular weight being at least about 10 percent greater than the lesser, or is selected from the group consisting of ethylene vinyl acetate copolymer, styrene diene block copolymers, natural rubber, isoprene rubber or a combination thereof. At least one poly(sulfonyl azide) preferably has a structure X—R—X wherein each X is $SO_2N_3$ and R represents an unsubstituted or inertly substituted hydrocarbyl, hydrocarbyl ether or silicon-containing group; wherein the poly(sulfonyl azide) has at least 3 and less than about 50 carbon, silicon or oxygen atoms between sulfonyl azide groups; and wherein R includes at least one aryl group between the sulfonyl groups or is preferably used in an amount greater than about 0.5 weight percent based on the total weight total polymeric admixtures or reacts at a temperature at least the decomposition temperature and greater than about 185° C.

The invention further includes all compositions obtainable by the process of the invention as well as all articles formed from these compositions. The articles are preferably thermoformed, compression molded, injection molded, extruded, cast, blow molded, blown, profile extruded, spun, foamed or molded of any composition of the invention. The invention includes a use of any composition of the invention in any process of thermoforming, injection molding, extrusion, casting, blow molding, spinning, blowing, profile extrusion, foaming, compression molding or a combination thereof.

DETAILED DESCRIPTION OF THE INVENTION

Practice of the invention is applicable to any olefin polymer (also referred to as polyolefin) which has been prepared using a single site catalyst and which has at least one C—H bond that can react with a compound capable of insertion into a carbon hydrogen (C—H) bond, including homopolymers and copolymers (including interpolymers, terpolymers, oligomers and other polymeric types), preferably with narrow comonomer distribution, narrow molecular weight distribution or a combination thereof, such as copolymers of ethylene with one or more alpha olefin (C3 to C20), including LLDPE (linear low density polyethylene), ethylene copolymers with unsaturation (EPDM or EODM, that is ethylene-propylene-diene or ethylene-octene-diene), or other polymers such as linear high density polyethylene, and the like.

Practice of this invention is also applicable to blends of two or more polymers, especially polyethylene, ethylene alpha olefin copolymers or a combination thereof, at least one of which is prepared using a single site catalyst which polymers have different average molecular weights. The higher average molecular weight is preferably more than about 10 percent greater than the lower average molecular weight in a blend of two polymer components. When there are more than two polymer components the highest and the lowest molecular weight are about 10 percent different from the molecular weight of the middle molecular weight component. The resulting blend, thus optionally has a Mw/Mn greater than 3.0 or 3.5 even though at least one component individually has an MWD less than about 3. If the higher average molecular weight of one polymer component is about 30 percent or more greater than that of another component of the blend, the blend often exhibits has more than one peak on a gel permeation chromatography (GPC) curve analysis. The term "bimodal" is used to refer to polymers which exhibit two peaks on a graphical representation of data from analysis appropriate to measure the property discussed, in this case the (GPC) curve. These distributions are viewed statistically, that is as statistical distributions. Thus where there is one peak, the distribution has one mode and is unimodal. Two peaks are bimodal. Two or more are multimodal. The blend is optionally an in reactor blend or a blend formed by passing a first polymer made in a first reactor into a second reactor where the second polymer is produced. Alternatively, optionally, the blend is made using a mixture of two or more single site catalysts. Those skilled in the art recognize that the peaks frequently have overlapping areas and that mathematical analysis is sometimes needed to distinguish multimodal curves from broad irregular curves.

In this invention, where preferred molecular weight distributions (MWD) (Mw/Mn) are given, those distributions refer to the MWD of at least one component which is preferably represented by one peak of the GPC curve.

Preferred polymers for use in the practice of the invention are polymers prepared from ethylene, advantageously ethylene in combination with other monomers polymerizable therewith. Such monomers include alpha olefins and other monomers having at least one double bond.

Alpha olefins having more than 2 carbon atoms include propylene, 1-butene, 1-pentene, 1-hexene, 1-octene, 1-nonene, 1-decene, 1-unidecene, 1-dodecene and the like as well as 4-methyl-1-pentene, 4-methyl-1-hexene, 5-methyl-1-hexene, vinylcyclohexene, and the like.

Interpolymers useful in the practice of the invention optionally and in one preferred embodiment include monomers having at least two double bonds which are preferably dienes or trienes. Suitable diene and triene comonomers include 7-methyl-1,6-octadiene, 3,7-dimethyl-1,6-octadiene, 5,7-dimethyl-1,6-octadiene, 3,7,11-trimethyl-1,6,10-octatriene, 6-methyl-1,5-heptadiene, 1,3-butadiene, 1,6-heptadiene, 1,7-octadiene, 1,8-nonadiene, 1,9-decadiene, 1,10-undecadiene, bicyclo[2.2.]hepta-2-5-diene (norbornadiene), tetracyclododecene, or mixtures thereof, preferably butadiene, hexadienes, and octadienes, most preferably 1,4-hexadiene, 4-methyl-1,4-hexadiene, 5-methyl-1,4-hexadiene, dicyclopentadiene, bicyclo[2.2.1]hepta-2-5-diene (norbornadiene) and 5-ethylidene-2-norbornene (ENB).

Polyolefins are formed by means within the skill in the art. The alpha olefin monomers and optionally other addition polymerizable monomers are polymerized under conditions within the skill in the art, using metallocene and other single site catalysts such as exemplified by U.S. Pat. No. 3,645,992 (Elston), U.S. Pat. No. 4,937,299 (Ewen et al.), U.S. Pat. No. 5,218,071 (Tsutsui et al.), U.S. Pat. Nos. 5,278,272, 5,324,800, 5,084,534, 5,405,922, 4,588,794, 5,204,419 all of which are incorporated by reference herein and the processes subsequently discussed in more detail.

Preferred polymers for use in the practice of the present invention are elastomeric. "Elastomeric polymer" means a polymer that can be stretched with the application of stress to at least twice its length and after release of the stress, returns to its approximate original dimensions and shape. The elastic recovery of an elastomeric polymer prior to vulcanization is generally at least 40 percent, preferably at least 60 percent, and more preferably at least 80 percent after the sample is elongated 100 percent of an original dimension at 20° C. according to the procedures of ASTM 4649.

Suitable elastomeric polymers for use in this invention include ethylene/α-olefin interpolymers. "α-Olefin" means a hydrocarbon molecule or a substituted hydrocarbon molecule (i.e. a hydrocarbon molecule comprising one or more atoms other than hydrogen and carbon, e.g. halogen, oxygen, nitrogen, etc.), the hydrocarbon molecule comprising (i) only one ethylenic unsaturation, this unsaturation located between the first and second carbon atoms, and (ii) at least 3 carbon atoms, preferably of 3 to 20 carbon atoms, in some cases preferably of 4 to 10 carbon atoms and in other cases preferably of 4 to 8 carbon atoms. Examples of preferred α-olefins from which the elastomers used in this invention are prepared include propylene, 1-butene, 1-pentene, 1-hexene, 1-octene, 1-dodecene, and mixtures of two or more of these monomers.

Preferred among the elastomeric polymers useful in the practice of this invention are the ethylene/α-olefin interpolymers, particularly those having a density less than about 0.9 g/cm$^3$. Preferred ethylene interpolymers include ethylene/α-olefin copolymers; ethylene/α-olefin/diene terpolymers; and interpolymers of ethylene and one or more other monomers which are copolymerizable with ethylene, These polymers include homogeneous linear ethylene polymers such as (a) those described in U.S. Pat. No. 3,645,992, and (b) those made using the so-called single site catalysts in a batch reactor having relatively high olefin concentrations as described, for example, in U.S. Pat. Nos. 5,026,798 and 5,055,438. Such polymers are commercially available. Representative of commercially available homogeneous linear ethylene polymers are TAFMER™ polymers made by Mitsui Petrochemical Industries, Ltd. and EXACT™ polymers made by Exxon Chemical Co. Each of the U.S. patents cited in this paragraph are incorporated herein by reference.

The elastomeric polymer is preferably substantially amorphous. The expression "substantially amorphous" means that the polymer has a degree of crystallinity less than about 25 percent. The elastomeric polymer more preferably has a crystallinity less than about 15 percent.

The elastomeric polymer may be the product of a single polymerization reaction or may be a polymer blend resulting from physical blending of polymers obtained from different polymerization reactions and/or resulting from using a mixed polymerization catalyst.

Especially preferred ethylene/α-olefin interpolymers are ethylene/1-octene, ethylene/1-hexene, ethylene/1-butene and ethylene/propylene copolymers produced via a constrained geometry single site catalyst. A process for making such copolymers is described in U.S. Pat. Nos. 5,272,236 and 5,278,272, both of which are incorporated by reference. Such ethylene interpolymers are preferably substantially linear olefin polymers having long chain branching. Substantially linear olefin polymers can be made by gas phase, solution phase, high pressure or slurry polymerization. These polymers are preferably made by solution polymerization. Substantially linear ethylene polymers (SLEP's) are commercially available from The Dow Chemical Co. under the trademark AFFINITY™ and from DuPont Dow Elastomers L.L.C. under the trademark ENGAGE™.

In one embodiment, starting material polyolefins are preferably substantially linear ethylene polymers (SLEPs). The substantially linear ethylene polymers (SLEPs) are homogeneous polymers having long chain branching. They are disclosed in U.S. Pat. Nos. 5,272,236 and 5,278,272, the disclosures of which are incorporated herein by reference. SLEPs include Affinity™ polyolefin plastomers (POPs) commercially available from The Dow Chemical Company and Engage™ polyolefin elastomers (POEs) commercially available from DuPont Dow Elastomers LLC as polymers made by the Insite™ Process and Catalyst Technology. Specific examples of useful Engage™ POEs include SM 8400, EG 8100, and CL 8001 and specific examples of useful Affinity™ POPs include FM-1570, HM 1100, and SM 1300, each of which is commercially available from The Dow Chemical Company. SLEPs can be prepared via the solution, slurry, or gas phase, preferably solution phase, polymerization of ethylene and one or more optional α-olefin comonomers in the presence of a constrained geometry catalyst, such as is disclosed in European Patent Application 416,815-A, incorporated herein by reference.

The substantially linear ethylene/α-olefin polymers are made by a continuous process using suitable constrained geometry catalysts, preferably constrained geometry catalysts as disclosed in U.S. Pat. No. 5,132,380 and U.S. application Ser. No. 545,403, filed Jul. 3, 1990, the teachings of all of which are incorporated herein by reference. The monocyclopentadienyl transition metal olefin polymerization catalysts taught in U.S. Pat. No. 5,026,798, the teachings of which is incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane, as well as inert, compatible, noncoordinating, ion forming compounds. Preferred cocatalysts are inert, noncoordinating, boron compounds.

The expression "continuous process" means a process in which reactants are continuously added and product is continuously withdrawn such that an approximation of a steady state (i.e. substantially constant concentration of reactants and product while carrying out the process) is achieved. The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers to be crosslinked according to the present invention, such as those disclosed in U.S. Pat. No. 3,914,342, incorporated herein by reference. The multiple reactors can be operated in series or in parallel, with at least one constrained geometry catalyst employed in one of the reactors.

The term "substantially linear" means that, in addition to the short chain branches attributable to homogeneous comonomer incorporation, the ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

In contrast to the term "substantially linear", the term "linear" means that the polymer lacks measurable or demonstrable long chain branches, i.e., the polymer is substituted with an average of less than 0.01 long chain branch/1000 carbons.

For ethylene/α-olefin interpolymers, "long chain branching" (LCB) means a chain length longer than the short chain branch that results from the incorporation of the α-olefin(s) into the polymer backbone. Each long chain branch has the same comonomer distribution as the polymer backbone and can be as long as the polymer backbone to which it is attached.

The empirical effect of the presence of long chain branching in the substantial linear ethylene/α-olefin interpolymers used in the invention is manifested in its enhanced rheological properties which are quantified and expressed herein in terms of gas extrusion rheometry (GER) results and/or melt flow, $I_{10}/I_2$, increases.

The presence of short chain branching of up to 6 carbon atoms in length can be determined in ethylene polymers by using $^{13}C$ nuclear magnetic resonance (NMR) spectroscopy and is quantified using the method described by Randall (Rev. Macromol. Chem. Phys., C.29, V. 2&3, p. 285–297), the disclosure of which is incorporated herein by reference.

As a practical matter, current $^{13}C$ nuclear magnetic resonance spectroscopy cannot distinguish the length of a long chain branch in excess of six carbon atoms. However, there are other known techniques useful for determining the presence of long chain branches in ethylene polymers, including ethylene/1-octene interpolymers. Two such methods are gel permeation chromatography coupled with a low angle laser light scattering detector (GPC-LALLS) and gel permeation chromatography coupled with a differential viscometer detector (GPC-DV). The use of these techniques for long chain branch detection and the underlying theories have been well documented in the literature. See, e.g., Zimm, G. H. and Stockmayer, W. H., J.Chem. Phys., 17,1301 (1949) and Rudin, A., Modern Methods of Polymer Characterization, John Wiley & Sons, New York (1991) pp. 103–112, both of which are incorporated by reference.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., presented data demonstrating that GPC-DV is a useful technique for quantifying the presence of long chain branches in SLEPs. In particular, deGroot and Chum found that the level of long chain branches in homogeneous substantially linear homopolymer samples measured using the Zimm-Stockmayer equation correlated well with the level of long chain branches measured using $^{13}C$ NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/octene copolymers.

deGroot and Chum also showed that a plot of Log ($I_2$) as a function of Log ($M_w$) as determined by GPC illustrates that the long chain branching aspects (but not the extent of long branching) of SLEPs are comparable to that of high pressure, highly branched low density polyethylene (LDPE) and are clearly distinct from ethylene polymers produced using Ziegler-type catalysts such as titanium complexes and ordinary catalysts for making homogeneous polymers such as hafnium and vanadium complexes.

SLEPs are further characterized as having:
(a) a melt flow ratio, $I_{10}/I_2 > 5.63$,
(b) a molecular weight distribution, $M_w/M_n$ as determined by gel permeation chromatography and defined by the equation:

$$(M_w/M_n) < (I_{10}/I_2) - 4.63,$$

(c) a critical shear stress at the onset of gross melt fracture, as determined by gas extrusion rheometry, of greater than $4 \times 10^6$ dynes/cm$^2$ or a gas extrusion rheology such that the critical shear rate at onset of surface melt fracture for the SLEP is at least 50 percent greater than the critical shear rate at the onset of surface melt fracture for a linear ethylene polymer, wherein the SLEP and the linear ethylene polymer comprise the same comonomer or comonomers, the linear ethylene polymer has an $I_2$, $M_w/M_n$ and density which are each within ten percent of the SLEP and wherein the respective critical shear rates of the SLEP and the linear ethylene polymer are measured at the same melt temperature using a gas extrusion rheometer, and (d) a single differential scanning calorimetry, DSC, melting peak between −30 and 150° C.

Generally, the $I_{10}/I_2$ ratio for the linear ethylene polymers is at least about 5.63, preferably at least about 7, especially at least about 8 or above. For the substantially linear ethylene/a-olefin polymers used in the compositions of the invention, the $I_{10}/I_2$ ratio indicates the degree of long chain branching, i.e., the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25.

The melt index for the substantially linear olefin polymers useful herein is preferably at least about 0.1 grams/10 minutes (g/10 min), more preferably at least about 0.5 g/10 min and especially at least about 1 g/10 min up to preferably about 100 g/10 min, more preferably up to about 50 g/10 min, and especially up to about 20 g/10 min.

Determination of the critical shear rate and critical shear stress in regards to melt fracture as well as other rheology properties such as Theological processing index (PI), is performed using a gas extrusion rheometer (GER). The gas extrusion rheometer is described by M. Shida, R. N. Shroff and L. V. Cancio in Polymer Engineering Science, Vol. 17, No. 11, p. 770 (1977), and in Rheometers for Molten Plastics by John Dealy, published by Van Nostrand Reinhold Co. (1982) on pp. 97–99, both of which are incorporated by reference herein in their entirety. GER experiments are generally performed at a temperature of 190° C., at nitrogen pressures between 250 to 5500 psig (1724 to 37921 kPa) using a 0.0754 mm diameter, 20:1 L/D die with an entrance angle of 1800. For the SLEPs described herein, the PI is the apparent viscosity (in kpoise) of a material measured by GER at an apparent shear stress of $2.15 \times 10^6$ dyne/cm$^2$. The SLEPs for use in the invention includes ethylene interpolymers and have a PI in the range of 0.01 kpoise (1 Pa/S) to 50 kpoise (5000 Pa/S), preferably 15 kpoise (1500 Pa/S) or less. The SLEPs used herein have a PI less than or equal to 70 percent of the PI of a linear ethylene polymer (either a Ziegler polymerized polymer or a linear uniformly branched polymer as described by Elston in U.S. Pat. No. 3,645,992) having an $I_2$, $M_w/M_n$ and density, each within ten percent of the SLEPs.

The Theological behavior of SLEPs can also be characterized by the Dow Rheology Index (DRI), which expresses a polymer's "normalized relaxation time as the result of long chain branching." (See, S. Lai and G. W. Knight ANTEC '93 Proceedings, INSITE™ Technology Polyolefins (SLEP)—New Rules in the Structure/Rheology Relationship of Ethylene α-Oefin Copolymers, New Orleans, La., May 1993, the disclosure of which is incorporated herein by reference). DRI values range from 0 for polymers which do not have any measurable long chain branching (e.g., Tafmer™ products available from Mitsui Petrochemical Industries and Exact™ products available from Exxon Chemical Company) to about 15 and are independent of melt index. In general, for low to medium pressure ethylene polymers (particularly at lower densities) DRI provides improved correlations to melt elasticity and high shear flowability relative to correlations of the same attempted with melt flow ratios. For the SLEPs useful in this invention, DRI is preferably at least 0.1, and especially at least 0.5, and most especially at least 0.8. DRI can be calculated from the equation:

$$DRI=(3652879*\tau_o^{1.00649}/\eta_o-1)/10$$

where $\tau_o$ is the characteristic relaxation time of the material and $\eta_o$ is the zero shear viscosity of the material. Both $\tau_o$ and $\eta_o$ are the "best fit" values to the Cross equation, i.e., $$\eta/\eta_o=1/(1+(\gamma \cdot \tau_o)^{1-n})$$

in which n is the power law index of the material, and $\eta$ and $\gamma$ are the measured viscosity and shear rate, respectively. Baseline determination of viscosity and shear rate data are obtained using a Rheometric Mechanical Spectrometer (RMS-800) under dynamic sweep mode from 0.1 to 100 radians/second at 190° C. and a Gas Extrusion Rheometer (GER) at extrusion pressures from 1,000 psi to 5,000 psi (6.89 to 34.5 MPa), which corresponds to shear stress from 0.086 to 0.43 MPa, using a 0.0754 mm diameter, 20:1 L/D die at 190° C. Specific material determinations can be performed from 140 to 190° C. as required to accommodate melt index variations.

An apparent shear stress versus apparent shear rate plot is used to identify the melt fracture phenomena and quantify the critical shear rate and critical shear stress of ethylene polymers. According to Ramamurthy in the Journal of Rheology, 30(2), 337–357, 1986, the disclosure of which is incorporated herein by reference, above a certain critical flow rate, the observed extrudate irregularities may be broadly classified into two main types: surface melt fracture and gross melt fracture.

Surface melt fracture occurs under apparently steady flow conditions and ranges in detail from loss of specular film gloss to the more severe form of "sharkskin." Herein, as determined using the above-described GER, the onset of surface melt fracture (OSMF) is defined as the loss of extrudate gloss. The loss of extrudate gloss is the point at which the surface roughness of the extrudate can only be detected by a 40×magnification. The critical shear rate at the onset of surface melt fracture for the SLEPs is at least 50 percent greater than the critical shear rate at the onset of surface melt fracture of a linear ethylene polymer having essentially the same $I_2$ and $M_w/M_n$.

Gross melt fracture occurs at unsteady extrusion flow conditions and ranges in detail from regular (alternating rough and smooth, helical, etc.) to random distortions. For commercial acceptability to maximize the performance properties of films, coatings and moldings, surface defects should be minimal, if not absent. The critical shear stress at the onset of gross melt fracture for the SLEPs, especially those having a density >0.910 g/cc, used in the invention is greater than $4 \times 10^6$ dynes/cm$^2$. The critical shear rate at the onset of surface melt fracture (OSMF) and the onset of gross melt fracture (OGMF) will be used herein based on the changes of surface roughness and configurations of the extrudates extruded by a GER.

The SLEPs used in the invention are also characterized by a single DSC melting peak. The single melting peak is determined using a differential scanning calorimeter standardized with indium and deionized water. The method involves 3–7 mg sample sizes, a "first heat" to about 180° C. which is held for 4 minutes, a cool down at 10 C./min. to −30° C. which is held for 3 minutes, and heat up at 10 C./min. to 140° C. for the "second heat". The single melting peak is taken from the "second heat" heat flow vs. temperature curve. Total heat of fusion of the polymer is calculated from the area under the curve.

For polymers having a density of 0.875 g/cc to 0.910 g/cc, the single melting peak may show, depending on equipment sensitivity, a "shoulder or a "hump" on the low melting side that constitutes less than 12 percent, typically, less than 9 percent, and more typically less than 6 percent of the total heat of fusion of the polymer. Such an artifact is observable for other homogeneously branched polymers such as Exact™ resins and is discerned on the basis of the slope of the single melting peak varying monotonically through the melting region of the artifact. Such an artifact occurs within 34 C., typically within 27 C., and more typically within 20° C. of the melting point of the single melting peak. The heat of fusion attributable to an artifact can be separately determined by specific integration of its associated area under the heat flow vs. temperature curve.

The SLEPs are analyzed by gel permeation chromatography (GPC) on a Waters 150° C. high temperature chromatographic unit equipped with differential refractometer and three columns of mixed porosity. The columns are supplied by Polymer Laboratories and are commonly packed with pore sizes of $10^3$, $10^4$, $10^5$ and $10^6$. The solvent is 1,2,4-trichlorobenzene, from which 0.3 percent by weight solutions of the samples are prepared for injection. The flow rate is 1.0 ml/min, unit operating temperature is 140° C., and the injection size is 100 microliters.

The molecular weight determination with respect to the polymer backbone is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968) to derive the equation $M_{polyethylene} = a \cdot (M_{polystyrene})^b$.

In this equation, a=0.4316 and b=1.0. Weight average molecular weight, $M_w$, is calculated in the usual manner according to the formula $$M_w = \Sigma(w_i \times M_i)$$

where $w_i$ and $M_i$ are the weight fraction and molecular weight, respectively, of the $i^{th}$ fraction eluting from the GPC column.

The density of the linear or the substantially linear ethylene polymers (as measured in accordance with ASTM D-792) for use in the present invention is generally less than about 0.95 g/cm³. The density is preferably at least about 0.85 g/cm³ and especially at least about 0.86 g/cm³ and preferably up to about 0.94 g/cm³, more preferably up to about 0.92 g/cm³. When the crosslinked resins are to be used for extrusion and injection molding, the density of the polymer is preferably at least 0.855 g/cm³, more preferably at least 0.865 g/cm³, and even more preferably at least 0.870 g/cm³, up to preferably 0.900 g/cm³, more preferably 0.885 g/cm³, and even more preferably up to 0.880 g/cm³. The most preferred density is determined primarily by the modulus of elasticity or flexibility desired in the molded article. The density remains substantially constant during crosslinking according to this invention.

The ethylene polymers which are conveniently crosslinked according to the practice of this invention are optionally any interpolymers of ethylene and at least one α-olefin. Suitable α-olefins are represented by the following formula:

in which R is a hydrocarbyl radical. R generally has from one to twenty carbon atoms. Suitable α-olefins for use as comonomers in a solution, gas phase or slurry polymerization process or combinations thereof include 1-propylene, 1-butene, 1-isobutylene, 1-pentene, 1-hexene, 4-methyl-1-pentene, 1-heptene and 1-octene, as well as other monomer types such as tetrafluoroethylene, vinyl benzocyclobutane, and cycloalkenes, e.g. cyclopentene, cyclohexene, cyclooctene, and norbornene (NB). Preferably, the α-olefin will be 1-butene, 1-pentene, 4-methyl-1-pentene, 1-hexene, 1-heptene, 1-octene, or NB, or mixtures thereof. More preferably, the α-olefin will be 1-hexene, 1-heptene, 1-octene, or mixtures thereof. Most preferably, the α-olefin will be 1-octene. The ethylene polymer crosslinked according to this invention is preferably a SLEP.

These interpolymers preferably contain at least about 2 weight percent, more preferably at least about 5 weight percent, α-olefin.

The polyolefin is a homopolymer, copolymer, or interpolymer. Preferably the homo or copolymers contain ethylene repeating units. In polyethylene copolymers, the comonomer content is greater than about 1 weight percent as determined by $^{13}C$ NMR (carbon 13 nuclear magnetic resonance) and more preferably greater than about 3 weight percent of any monomer copolymerizable with ethylene, preferably an alpha olefin or cyclic olefin, more preferably such an olefin of less than about 20 carbon atoms, most preferably from about 2 to about 18 carbon atoms. The comonomer content is at least one comonomer polymerizable with ethylene, preferably less than about 4 comonomers polymerizable with ethylene, more preferably less than 2 such comonomers.

In one embodiment, preferred polymers for starting materials useful in the practice of this invention are slurry high density polyethylene homopolymers advantageously made using single site catalysis. When the polymer has a narrow molecular weight distribution (MWD), that MWD is preferably less than about 3.5 Mw/Mn, more preferably less than 3.0, most preferably less than 2.5, most preferably with density greater than about 0.945 g/ml. In a blend of two or more polymers including at least one HDPE made using a single site catalyst, at least one of the components, preferably all the components have a MWD preferably less than 3.5, more preferably less than 3.0, most preferably less than 2.5. In these instances the composition, although a preferred embodiment, optionally has an overall MWD greater than 3.5. The polymer blends are optionally formed, for instance to optimize processability and mechanical properties. Forming the blends compositions is within the skill in the art, for instance two or more different molecular weight polymers with single catalyst can be blended in reactor. The melt index (MI) of the starting material is preferably at least about 0.01, more preferably at least about 0.1 g/10 min b because a MI less than 0.01 g/10 min is generally associated with a viscosity sufficiently high to be difficult to melt shape into articles. Preferably the MI is less than about 100 g/10 min, more preferably less than about 20 g/10 min because the polymer with melt index greater than 100 g/10 min often has a poor toughness. These polymers have a good balance of (a) mechanical properties of a resulting article, also referred to herein as a final part and (b) processability of polymer in the shaping step(s).

The most preferred polymers as starting materials for this invention are ethylene copolymers with narrow MWD (that is a Mw/Mn of less than 3.5, more preferably less than 3.0, most preferably less than 2.5) of a blend composition or of at least one component of a blend composition. These can be produced using at least one C3-C20 olefin comonomer. Most preferred for copolymer is C3-C10. About 0.5–40 mole percent comonomer as determined by ASTM 5017 is preferred in the starting material. The preferred melt index of the starting material depends on applications; however, the preferred melt index is from about 0.01 to about 20 g/10 min. Commercially available polymers in this category are known as TAFMER™ polymer commercially available from Mitsui Petrochemical Industries, EXACT™ polymer commercially available from Exxon Chemical Company, AFFINITY™ polyolefin plastomer commercially available from The Dow Chemical Company, ENGAGE™ polyolefin elastomer commercially available from DuPont-Dow Elastomers, and the like. For thermoplastic applications such as film and injection molding, the most preferred comonomer content is between about 3–25 weight percent. For elastomeric applications, the preferred comonomer content is between about 20–40 weight percent. The most preferred terpolymer is an EPDM such as NORDEL IP™ ethylene/ propylene/ diene polymer commercially available from DuPont-Dow Elastomers.

The melt index is measured according to ASTM D-1238 condition 190° C./2.16 Kg(formerly known as Condition E).

In a particularly preferred embodiment the polymer is an ethylene/α-olefin/diene terpolymer. Suitable α-olefins include the α-olefins described previously as suitable for making ethylene α-olefin copolymers. The dienes suitable as monomers for preparation of such terpolymers are either conjugated or nonconjugated, typically nonconjugated dienes having from 6 to 15 carbon atoms. Representative examples of suitable nonconjugated dienes that may be used to prepare the terpolymer include:
a) Straight chain acyclic dienes such as 1,4-hexadiene, 1,5-heptadiene, and 1,6-octadiene;
b) branched chain acyclic dienes such as 5-methyl-1,4-hexadiene, 3,7-dimethyl-1,6-octadiene, and 3,7-dimethyl-1,7-octadiene;
c) single ring alicyclic dienes such as 4-vinylcyclohexene, 1-allyl-4-isopropylidene cyclohexane, 3-allylcyclopentene, 4-allylcyclohexene, and 1-isopropenyl-4-butenylcyclohexane;
d) multi-ring alicyclic fused and bridged ring dienes such as dicyclopentadiene; alkenyl, alkylidene, cycloalkenyl and cycloalkylidene norbornenes such as 5-methylene-2-norbornene, 5-methylene-6-methyl-2-norbornene, 5-methylene-6, 6-dimethyl-2-norbornene, 5-propenyl-2-norbornene, 5-(3-cyclopentenyl)-2-norbornene, 5-ethylidene-2-norbornene, and 5-cyclohexylidene-2-norbornene; and the like.

The preferred dienes are selected from the group consisting of 1,4-hexadiene, dicyclopentadiene, 5-ethylidene-2-norbornene, 5-methylene-2-norbornene, 7-methyl-1,6-octadiene, piperylene; 4-vinylcyclohexene, etc.

The preferred terpolymers for the practice of the invention are terpolymers of ethylene, propylene and a nonconjugated diene (EPDM). Such terpolymers are or will be commercially available from such companies as DuPont Dow Elastomers L.L.C.

The total diene monomer content in the terpolymer may suitably range from about 0.1 to about 15 weight percent, preferably 0.5 to about 12 weight percent, and most preferably about 1.0 to about 6.0 weight percent.

Both the ethylene copolymers and the ethylene terpolymers comprise from about 20 to about 90 weight percent, preferably from about 30 to about 85 weight percent, ethylene with the other comonomers comprising the balance. The ethylene copolymers and terpolymers preferably have a weight average molecular weight ($M_w$) of at least about 10,000, and more preferably at least about 15,000, and may have a $M_w$ of up to about 1,000,000 or higher, preferably up to about 500,000.

The ethylene homo- and copolymers used as starting materials of the invention, especially the high density polyethylene (density greater than about 0.94 g/cc), are preferably of are made using single site catalysts and preferably are of narrow molecular weight distribution (MWD), that is Mw/Mn of preferably less than about 3.5, more preferably less than about 2.5, most preferably less than about 2.

The polyolefins previously discussed, especially the preferred species, and more preferably the ethylene homopolymers and copolymers, most preferably elastomers, are optionally used in blends comprising at least one of the polyolefins (first polymer) and at least one polymer different from the first polymer (second polymer). The second polymer is any thermoplastic, preferably selected from poly vinyl chloride, polypropylene, polyethylene terephthalate, polystyrene or other vinyl aromatic polymer, styrenic block copolymers and the like. Ethylene homopolymers and copolymers produced using single site catalysts are optionally blended with polyolefin-carbon monoxide (CO) copolymers such as ethylene-carbon monoxide copolymers, propylene-carbon monoxide copolymers, and ethylene-propylene-carbon monoxide copolymers. Polymers having carbon monoxide are within the skill in the art and are commercially available from The Dow Chemical Company and Shell Oil Company. Alternatively, they are prepared by means within the skill in the art such as that disclosed U.S. Pat. Nos. 3,835,123; 3,984,388; 4,970294; 5,554,777 and 5,565,547; which are incorporated herein by reference in their entireties. Advantageous polymers for blends also include, but are not restricted to different ethylenic polymer or other natural or synthetic polymers. Advantageous different ethylenic polymers include low (LDPE) (for example, formed using high pressure, free-radical polymerization techniques), medium (MDPE), and high density polyethylenes (HDPE) (for example, those made using Ziegler catalysts as in U.S. Pat. No. 4,076,698), ethylene/ester copolymers, ethylene/vinyl acetate copolymers, copolymers of ethylene and ethylenically unsaturated carboxylic acid, homo and copolymers of alpha olefins, and the like. In each blend used in the practice of the present invention, at least one of the polymer components is formed using a single site catalyst.

When the polyolefins formed using single site catalysts are used in blends, they are advantageously used in amounts sufficient to result in improved properties (detailed hereinafter) attributable to their presence as compared with the presence of a polymer of the same monomer composition, number average molecular weight (Mn) and density. Preferably the polyolefins prepared using single site catalysts constitute at least about 5 weight percent of any blend used as starting material of the present invention, more preferably at least about 10 weight percent, most preferably at least about 20 weight percent. In a most preferred embodiment the blend contains 100 percent polyolefins made using single site catalysts, preferably metallocene catalysts. More specifically, for the purpose of improving impact strength, elastomers made using single site catalysts are preferably present in amounts less than about 30 weight percent, more preferably from about 5 to about 30 weight percent. In a blend of an HDPE and an elastomer, the elastomer made using single site catalyst is preferably present in amounts up to about 90 weight percent, and more preferably from about 70 to about 90 weight percent. The addition of HDPE facilitates shaping the admixture before crosslinking (green state).

Preferred blends include Blends (1): blends of two or more polyolefins, made using single site catalysts; Blends (2): blends of at least one polyolefin made using a single site catalyst with at least one polyolefin, preferably ethylene polymer made using a Ziegler Natta or free radical catalyst or a combination thereof; Blends (3): blends of at least one polyolefin made using a single site catalyst with at least one elastomer not included in the description of Blends (1) or Blends (2); or Blends (4): at least one polyolefin made using a single site catalyst with at least one thermoplastic polymer. In each case the polyolefin(s) made using single site catalysts are preferably ethylene polymers or copolymers.

Within Blends (1) and Blends (2) are the blends of polymers having different molecular weights but similar densities. These are advantageously formed for the purpose of balancing mechanical properties such as lower compression set (ASTM D-395 (60° C., 25 percent compression)) and high tensile strength (ASTM D-412) of the resulting crosslinked product and processibility as indicated by ratio of I2/I10 measured by the procedures of ASTM-1238 at 190° C. at 2.16 kg for I2 and 10 kg for $I_{10}$ of the starting material admixture in the green state (mixture containing poly(sulfonyl azide) and polymer(s) before crosslinking). In these blends, one preferred embodiment is a blend of at least two HDPE polymers. An alternative preferred embodiment is a bimodal molecular weight blend including at least one ethylene-alpha olefin elastomers useful for instance for wire cables, gaskets, profile extrusion, roof membranes and the like. In another embodiment a bimodal density blend is formed to obtain balanced mechanical properties such as hardness as measured by ASTM D2240-91 and toughness as measured by ASTM D412-87 of the crosslinked polymers. In this case, the blend is preferably a blend of HDPE with less than about 30 weight percent of elastomer to improve the toughness of crosslinked blend for building construction materials, appliances, and auto motive parts. In yet another embodiment, a preferred blend includes elastomeric polymers blended with less than about 30 weight percent of HDPE or LDPE improve the processability such as to reduce the sticking with the mold during part shaping step for such applications as wire or cable jackets, gaskets, profile extrusion, roof membrane and the like.

In Blends (3), suitable elastomers include ethylene-vinyl acetate copolymer (EVA), copolymers of ethylene and ethylenically unsaturated carboxylic acid, styrene butadiene block copolymers, natural rubber, isoprene rubber and the like. Blends of single site ethylene/alpha-ethylene elastomer with EVA for wire and cable jacketing, gaskets, profile extrusion and the like as preferred embodiments.

In Blends (4), suitable thermoplastics include polyvinyl chloride, chloride, polypropylene, polyethylene terephthalate, polystyrene or other vinyl aromatic polymer, polyolefin-carbon monoxide copolymers. The polyolefin prepared using a single site catalyst is preferably an elastomer. Preferably, the blend contains less than 30 weight percent of elastomer to increase the toughness of the thermoplastic component; the elastomer preferably has a viscosity sufficiently close to that of the thermoplastic component to achieve homogeneous mixing and dispersion of elastomer in the thermoplastics. Such blends are useful, for instance, for building construction materials, appliances, and automotive parts. In one embodiment, the thermoplastic blend component is preferably a polymer having tertiary carbon hydrogen bonds such as a propylene polymer. The term propylene polymers is used to mean homopolymers, copolymers and interpolymers of propylene, preferably having at least about 50 weight percent propylene. Practice of the invention is especially useful with polymers having tertiary C—H bonds because use of free radical-generating crosslinking agents like peroxides often induces scission at such tertiary sites; therefore, by comparison, practice of the invention results in less chain scission than use of peroxides or other free radical crosslinking means.

Preferred olefinic polymers for the production of the foam structures of this invention include linear high density polyethylene (HDPE), linear low density polyethylene (LLDPE) made using single site catalyst. These olefinic polymers include, for instance, polymers commercially available from the Dow Chemical Company under the trade designation Affinity polyolefin plastomers; polymers commercially available from Mitsui Petrochemicals Company Limited under the trade designation TAFMER™ polymers; polymers commercially available from Exxon Chemical Company under the trade designation EXACT™ polymers; and polymers commercially available from DuPont Dow Elastomers LLC under the trade designation ENGAGE™ polymers and Nordel IP EPDM.

The polymers described previously as suitable and preferred for use in the practice of the invention to form crosslinked polymers are also those suitable and preferred, respectively, for use in making crosslinked foams except that the most preferred blends for making foams are blends of an elastomer made using single site catalysts with at least one other elastomer such as EVA, natural rubber, styrene butadiene block copolymers, ethylene styrene interpolymer, or a combination thereof. For the purposes of crosslinking, the polymer is reacted with a polyfunctional compound capable of insertion reactions into C—H bonds. Such polyfunctional compounds have at least two, preferably 2, functional groups capable of C—H insertion reactions. Those skilled in the art are familiar with C—H insertion reactions and functional groups capable of such reactions. For instance, carbenes as generated from diazo compounds, as cited in Mathur, N. C.; Snow, M. S.; Young, K. M., and Pincock, J. A.; Tetrahedron, (1985), 41(8), pages 1509–1516, and nitrenes as generated from azides, as cited in Abramovitch, R. A.,; Chellathurai, T.; Holcomb, W. D; McMaster, I. T.; and Vanderpool, D. P.; J. Org. Chem., (1977), 42(17), 2920–6, and Abramovitch, R. A., Knaus, G. N., J. Org. Chem., (1975), 40(7), 883–9.

Compounds having at least two functional groups capable of C—H insertion under reaction conditions are referred to herein as crosslinking agents. Some such agents include Such crosslinking agents include alkyl and aryl azides (R—$N_3$), acyl azides (R—C(O)$N_3$), azidoformates (R—O—C(O)—$N_3$), phosphoryl azides ((RO)$_2$—(PO)—$N_3$), phosphinic azides ($R_2$—P(O)—$N_3$) and silyl azides ($R_3$—Si—$N_3$).

Polyfunctional compounds capable of insertions into C—H bonds include poly(sulfonyl azide)s. The poly(sulfonyl azide) is any compound having at least two sulfonyl azide groups (—$SO_2N_3$) reactive with the polyolefin. Preferably the poly(sulfonyl azide)s have a structure X—R—X wherein each X is $SO_2N_3$ and R represents an unsubstituted or inertly substituted hydrocarbyl, hydrocarbyl ether or silicon-containing group, preferably having sufficient carbon, oxygen or silicon, preferably carbon, atoms to separate the sulfonyl azide groups sufficiently to permit a facile reaction between the polyolefin and the sulfonyl azide, more preferably at least 1, more preferably at least 2, most preferably at least 3 carbon, oxygen or silicon, preferably carbon, atoms between functional groups. While there is no critical limit to the length of R, each R advantageously has at least one carbon or silicon atom between X's and preferably has less than about 50, more preferably less than about 30, most preferably less than about 20 carbon, oxygen or silicon atoms. Within these limits, larger is better for reasons including thermal and shock stability. When R is straight-chain alkyl hydrocarbon, there are preferably less than 4 carbon atoms between the sulfonyl azide groups to reduce the propensity of the nitrene to bend back and react with itself. Silicon containing groups include silanes and siloxanes, preferably siloxanes. The term inertly substituted refers to substitution with atoms or groups which do not undesirably interfere with the desired reaction(s) or desired properties of the resulting crosslinked polymers. Such groups include fluorine, aliphatic or aromatic ether, siloxane as well as sulfonyl azide groups when more than two polyolefin chains are to be joined. Suitable structures include R as aryl, alkyl, aryl alkaryl, arylalkyl silane, siloxane or heterocyclic, groups and other groups which are inert and separate the sulfonyl azide groups as described. More preferably R includes at least one aryl group between the sulfonyl groups, most preferably at least two aryl groups (such as when R is 4,4' diphenylether or 4,4'-biphenyl). When R is one aryl group, it is preferred that the group have more than one ring, as in the case of naphthylene bis (sulfonyl azides). Poly(sulfonyl)azides include such compounds as 1,5-pentane bis(sulfonyl azide), 1,8-octane bis (sulfonyl azide), 1,10-decane bis(sulfonyl azide), 1,10-octadecane bis(sulfonyl azide), 1-octyl-2,4,6-benzene tris (sulfonyl azide), 4,4'-bis(benzenesulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from about 2 to 5 sulfonyl azide groups per molecule, and mixtures thereof. Preferred poly(sulfonyl azide)s include oxy-bis(4-sulfonylazidobenzene), 2,7-naphthalene bis(sulfonyl azido), 4,4'-bis(sulfonyl azido) biphenyl, 4,4'-oxybis(benzenesulfonyl azide) and bis(4-sulfonyl azidophenyl)methane, and mixtures thereof.

Sulfonyl azides are conveniently prepared by the reaction of sodium azide with the corresponding sulfonyl chloride, although oxidation of sulfonyl hydazines with various reagents (nitrous acid, dinitrogen tetroxide, nitrosonium tetrafluoroborate) has been used.

Polyfunctional compounds capable of insertions into C—H bonds also include carbene-forming compounds such as salts of alkyl and aryl hydrazones and diazo compounds, and nitrene-forming compounds such as alkyl and aryl azides (R—$N_3$), acyl azides (R—C(O)$N_3$), azidoformates (R—O—C(O)—$N_3$), sulfonyl azides (R—$SO_2$—$N_3$), phosphoryl azides ((RO)$_2$—(PO)—$N_3$), phosphinic azides ($R_2$—P(O)—$N_3$) and silyl azides ($R_3$—Si—$N_3$). Some of the crosslinking agents of the invention are preferred because of their propensity to form a greater abundance of carbon-hydrogen insertion products. Such compounds as the salts of hydrazones, diazo compounds, azidoformates, sulfonyl azides, phosphoryl azides, and silyl azides are preferred because they form stable singlet-state electron products (carbenes and nitrenes) which carry out efficient carbon-hydrogen insertion reactions, rather than substantially 1) rearranging via such mechanisms as the Curtius-type rearrangement, as is the case with acyl azides and phosphinic azides, or 2) rapidly converting to the triplet-state electron configuration which preferentially undergoes hydrogen atom abstraction reactions, which is the case with alkyl and aryl azides. Also, selection from among the preferred crosslinking agents is conveniently possible because of the differences in the temperatures at which the different classes of crosslinking agents are converted to the active carbene or nitrene products. For example, those skilled in the art will recognize that carbenes are formed from diazo compounds efficiently at temperatures less than 100° C., while salts of hydrazones, azidoformates and the sulfonyl azide compounds react at a convenient rate at temperatures above 100° C., up to temperatures of about 200° C. (By convenient rates it is meant that the compounds react at a rate that is fast enough to make commercial processing possible, while reacting slowly enough to allow adequate mixing and compounding to result in a final product with the crosslinking agent adequately dispersed and located substantially in the desired position in the final product. Such location and dispersion may be different from product to product depending on the desired properties of the final product.) Phosphoryl azides may be reacted at temperatures in excess of 180° C. up to about 300° C., while silyl azides react preferentially at temperatures of from about 250° C. to 400° C.

To crosslink a polymer the crosslinking agent is used in a crosslinking amount, that is an amount effective to result in at least about 10 weight percent gel as measured by ASTM D2765-procedure A. Preferably at least about 30 percent gel, more preferably at least about 50 percent, most preferably about 90 percent gel is achieved in the practice of the invention. That is, the polymer is most preferably converted from a thermoplastic to a thermoset polymer. While those skilled in the art will recognize that the amount of poly (sulfonyl azide) sufficient to crosslink and result at least about 10 weight percent gel will depend on molecular weight of the azide used, desired gel level and polymer characteristics, the amount is advantageously at least about 0.5 percent, preferably at least about 1 percent, more preferably at least about 1.5 weight, most preferably at least about 2 percent, even more preferably at least about 5 percent poly(sulfonyl azide) based on total weight of polymer when the poly(sulfonyl azide) has a molecular weight of from about 200 to about 2000. To avoid bubbles from release of nitrogen by poly(sulfonyl azide) in excess of that amount which reacts with the polymer (when bubbles are not desired) the amount of poly(sulfonyl azide) is preferably less than about 15, more preferably less than about 10, most preferably less than about 5 weight percent based on total polymer.

To achieve crosslinking, the poly(sulfonyl azide) is heated in the presence of the polymer to at least the decomposition temperature of the sulfonyl azide. By decomposition temperature of the poly(sulfonyl azide) it is meant that temperature at which the azide converts to the sulfonyl nitrene, eliminating nitrogen and heat in the process, as determined by differential scanning calorimetry (DSC). The poly (sulfonyl azide)begins to react at a kinetically significant rate (convenient for use in the practice of the invention) at temperatures of about 130° C. and is almost completely reacted at about 160° C. in a DSC (scanning at 10° C./min). ARC (scanning at 2° C./hr) shows onset of decomposition is about 100° C. Extent of reaction is a function of time and temperature. Temperatures for use in the practice of the invention are also determined by the softening or melt temperatures of the polymer starting materials. For these reasons, the temperature is advantageously greater than about 90° C., preferably greater than about 120° C., more preferably greater than about 150° C., most preferably greater than 180° C.

Preferred times at the desired decomposition temperatures are times that are sufficient to result in reaction of the crosslinking agent with the polymer(s) without undesirable thermal degradation of the polymer matrix. Preferred reaction times in terms of the half life of the crosslinking agent, that is the time required for about half of the agent to be reacted at a preselected temperature, which half life is determinable by DSC is about 5 half lives of the crosslinking agent. In the case of a bis(sulfonyl azide), for instance, the reaction time is preferably at least about 4 minutes at 200° C. When a larger mass of polymer or thick article is produced, longer time periods are often required for adequate heat to penetrate the polymer; such times are conveniently around 20 minutes.

The process of the invention preferably includes steps of (a) admixing a polyolefin and at least a crosslinking amount of at least one crosslinking agent which reacts with the polyolefin by C—H insertion; (b) shaping the resulting admixture; and (c) heating the resulting shaped admixture at least to the decomposition temperature of the crosslinking agent such that a crosslinked polyolefin is formed.

The admixing of the polymer and crosslinking agent is conveniently accomplished by any means within the skill in the art.

Preferred processes of step (a) admixing polyolefin and crosslinking agent include at least one of (a) dry blending the crosslinking agent with the polymer, preferably to form a substantially uniform admixture and adding this mixture to melt processing equipment, e.g. a melt mixer or shaping device in which mixing takes place, at a temperature less than the decomposition temperature of the crosslinking agent; (b) introducing, e.g. by injection, a crosslinking agent in liquid form, e.g. dissolved in a solvent therefor or in a slurry of crosslinking agent in a liquid, into a device containing polymer, preferably softened, molten or melted polymer, but alternatively in particulate form, in solution or dispersion, more preferably in melt processing equipment (Within the art the polymer is often said to imbibe the liquid); (c) forming a first admixture of a first amount of a first polymer and a crosslinking agent, advantageously at a temperature less than about the decomposition temperature of the crosslinking agent, preferably by melt blending, and then forming a second admixture of the first admixture with a second amount of a second polymer (for example a concentrate of a crosslinking agent admixed with at least one polymer and optionally other additives, is conveniently admixed into a second polymer or combination thereof optionally with other additives, to crosslink the second polymer(s)); (d) feeding at least one crosslinking agent, preferably in solid form, more preferably finely comminuted, e.g. powder, directly into softened or molten polymer, e.g. in melt processing equipment, e.g. in an extruder; or combinations thereof. Among processes (a) through (d), processes (b) and (c) are preferred, with (c) most preferred. For example, process (c) is conveniently used to make a concentrate with a first polymer composition having a lower melting temperature, advantageously at a temperature below the decomposition temperature of the crosslinking agent, and the concentrate is melt blended into a second polymer composition having a higher melting temperature. Concentrates are especially preferred when temperatures are sufficiently high to result in loss of crosslinking agent by evaporation or decomposition not leading to reaction with the polymer, or other conditions would result that effect. When the crosslinking agent is added in a dry form it is preferred to mix the agent and polymer in a softened or molten state below the decomposition temperature of the crosslinking agent then to shape the resulting admixture.

Thus the steps of forming an admixture often involves at least two steps, a first step of admixing the polymer in particulate form, e.g. pellets with the crosslinking agent and optionally other additives then a melting step which optionally and preferably includes additional mixing. Alternatively, the shaping step preferably involves a step of melting the polymer admixture.

The term "melt processing" is used to mean any process in which the polymer is softened or melted, such as extrusion, pelletizing, molding, thermoforming, film blowing, compounding in polymer melt form, fiber spinning, and the like.

The polyolefin(s) and crosslinking agent are suitably combined in any manner which ultimately results in desired reaction thereof, preferably by mixing the crosslinking agent with the polymer(s) under conditions which allow sufficient mixing before reaction, most preferably before shaping) to avoid uneven amounts of localized reaction then subjecting the resulting admixture to heat sufficient for reaction.

Preferably, a substantially uniform admixture of crosslinking agent and polymer is formed before exposure to conditions in which chain crosslinking takes place. A substantially uniform admixture is one in which the distribution of crosslinking agent in the polymer is sufficiently homogeneous to be evidenced by a polymer having consistent tensile and elongation properties in various samples of the polymer and not having observable gel particles or bubbles in cured samples. This mixing is preferably attained with the polymer in a molten or melted state, that is above the crystalline melt temperature, or in a dissolved or finely dispersed condition rather than in a solid mass or particulate form. The molten or melted form is more preferred to insure homogeniety rather than localized concentrations at the surface.

Any equipment is suitably used, preferably equipment which provides sufficient mixing and temperature control in the equipmente. Advantageously practice of the invention takes place in such devices as an extruder or a static polymer mixing devise such as a Brabender blender or a Banbury mixer.

In the admixing step other additives within the skill in the art are optionally also admixed into the polymer. The crosslinked polymers of the invention optionally include various additives, such as carbon black, silica, titanium dioxide, colored pigments, clay, zinc oxide, stearic acid, accelerators, curing agents, sulfur, stabilizers, coagent, antidegradants, processing aids, adhesives, tackifiers, plasticizers, wax, precrosslinking inhibitors, discontinuous fibers (such as wood cellulose fibers) and extender oils. Such additives are optionally provided either prior to, during, or subsequent to crosslinking (curing) the polyolefin elastomers. The polyolefin elastomers are often mixed with a filler, an oil, and a curing agent preferably at an elevated temperature (above room temperature, but preferably below the decomposition temperature of the crosslinking agent) to compound them. The compounded material is the subsequently cured at a temperature which is typically greater than that employed during compounding. Coagents such as trallyl cyanurate and trimethylpropane trimethacrylatethe are optionally used to improve the crosslinking efficiency. The amount of coagent is about 0.2 to 15 weight percent (based on weight of polymer), and preferably from 1 weight percent to 5 weight percent.

Preferably, carbon black will be added to the polyolefin elastomers prior to curing. Carbon black is typically added to improve the tensile strength or toughness of the compounded product, but can also be used as an extender or to mask the color of the compounded product. Carbon black is preferably present in an amount from 0 to 80 weight percent, more preferably from 0.5 to 50 weight percent, based on the total weight of the formulation. When the carbon black is employed to mask a color, it is preferably employed in the range of 0.5 to 10 weight percent, based on the weight of the formulation. When the carbon black is employed to increase toughness and/or decrease the cost of the formulation, it is advantageously employed in amounts greater than 10 weight percent based on the weight of the formulation.

Moreover, preferably, one or more extender oils will be added to the polymer prior to crosslinking. Extender oils are advantageously added to improve processability and low temperature flexibility, as well as to decrease cost. Suitable extender oils are within the skill in the are for instance as listed in Rubber World Blue Book 1975 Edition, Materials and Compounding Ingredients for Rubber, pages 145–190. Typical classes of extender oils include aromatic, naphthenic, and paraffinic extender oils. The extender oil(s)

advantageously used in an amount from 0 to 50 weight percent. When employed, the extender oil advantageously present in an amount of at least 5 weight percent, more advantageously in an amount of from 15 to 25 weight percent, based on the total weight of the formulation.

After mixing, the polymer is preferably shaped before being crosslinked. Shaping is within the skill in the art and includes such processes as coating on wire or cable, compression molding, thermoforming blow molding, fiber making, foaming, profile extrusion into such shapes as gaskets or weather stripping. Within the skill in the art are many types of molding operations which is useful to form useful fabricated articles or parts from the formulations disclosed herein, including various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference), profile extrusion, calendering, pultrusion and the like.

Advantageously after being shaped, the polymer is heated at least to the decomposition temperature of the crosslinking agent for a sufficient time to result in the desired crosslinking. Heating is within the skill in the art such as by oven, water bath, sand bath or the like.

Thus, the process of the invention comprises (a) forming a polymeric admixture including at least one polyolefin which has been prepared using a single site catalyst and at least a crosslinking amount of at least one poly(sulfonyl azide) crosslinking agent; (b) shaping the resulting admixture; and (c) heating the resulting shaped admixture to a temperature which is at least the decomposition temperature of the crosslinking agent. Those steps optionally occur in any order which results in a crosslinked product. The preferred order is alphabetic, but especially in the case of foams, steps are optionally completely or partially in another order or simultaneous. For instance, some heating to the decomposition temperature optionally occurs before or during shaping, for instance to increase melt strength. In another embodiment, shaping could precede and follow heating to the decomposition temperature, for instance in a foam where a slab is formed before heating and pressure is decreased after the heating. All variations of the steps that result in a crosslinked polymer are within the scope of the invention.

Practice of the process of the invention to crosslink polymers yields crosslinked polymers, that is the polymers which have sulfonamide crosslinking between different polymer chains. Crosslinked HDPE (density greater than 0.94 g/cc) made using single site catalyst, preferably with narrow molecular distribution, is useful in pipe, fuel tanks, chemical tanks and agricultural tanks. Resulting crosslinked polymers advantageously show higher creep resistance as measured by ASTM D-2990-77 and higher upper service temperature as measured by TMA (as described hereinafter) than the starting material polymer due to crosslinking of polymer chains. After both are crosslinked as taught herein, articles and fibers of HDPE made using single site catalyst advantageously have higher toughness as measured by the procedures of ATSM D-412 than those of an HDPE made a Ziegler Natta catalyst and treated according to the practice of the invention. Crosslinked HDPE is useful in fiber including woven and non woven fiber.

Medium density polyethylene copolymer made using single site catalyst and crosslinked according to the practice of the invention is useful in film, wire-cable insulation, fibers, chemical tanks, sheeting.

Articles made from crosslinked polyethylene copolymer made using single site catalysts, preferably having narrow molecular weight distribution of at least one and more preferably all components, have better toughness as measured by ASTM D-412, elongation as measured by ASTM D-412, and tensile strength as measured by ASTM D-412 than the corresponding articles made from a corresponding polymer made using Ziegler Natta catalyst also crosslinked using poly(sulfonyl azide) or a corresponding article made using polyethylene copolymer made using single site catalyst and crosslinked using peroxide crosslinking agent. A crosslinked polyolefin made using single site catalyst and crosslinked according to the practice of the invention has better organoleptic properties, better oxidative stability (ASTM 573-88), and better weatherability (ASTM D-2565) than a corresponding polymer crosslinked using a peroxide as a crosslinking agent. A corresponding polymer is one having the same density and number average molecular weight.

The crosslinked polyolefin elastomers of the invention are also useful in many applications such as wire and cable coating, roofing membranes, floor coverings, gaskets, hoses, boots, automotive parts, weatherstripping, and other parts known to require elastomeric materials. Roofing membrane, gasket, boots, and weatherstripping made from crosslinked elastomer of this invention have better compression set as measured by ASTM-D-395, better weatherability (ASTM 2565), and better oxidative stability (ASTM D 573-88)than the corresponding article made using peroxide crosslinking agent as disclosed in the prior art (U.S. Pat. No. 5,580,920).

The cable insulation of this invention can be filled or unfilled. If filled, then the amount of filler present should not exceed an amount that would cause degradation of the electrical and/or mechanical properties of the crosslinked elastomers. Advantageously, the amount of filler present is between 20 and 80, preferably between 50 and 70, weight percent based on the weight of the polymer. Representative fillers include kaolin clay, magnesium hydroxide, silica, calcium carbonate. In a preferred embodiment of this invention in which a filler is present, the filler is coated with a material that will prevent or retard any tendency that the filler might otherwise have to interfere with the crosslinking reaction.

Other additives is useful in the preparation of and be present in the insulation of this invention, and include antioxidants, processing aids, pigments and lubricants.

The cable insulation of this invention can be applied to a cable in known amounts and by known methods (for example, with the equipment and methods described in U.S. Pat. Nos. 5,246,783 and 4,144,202). Advantageously, the cable insulation is prepared in a reactor-extruder equipped with a cable-coating die and after the components of the insulation are formulated, the insulation composition is extruded over the cable as the cable is drawn through the die.

Hallmarks of this cable insulation include improved: tree resistance as measured by ASTM-D 3756, tensile strength as measured by ASTM-D-412, elongation as measured by ASTM-D-412, and compression set as measured by ASTM-D-395 in comparison to peroxide crosslinked polyolefin elastomers In another embodiment of this invention, substantially linear ethylene polymers crosslinked in accord with the present invention are shaped into automotive weatherstripping. This weatherstripping is useful as a sealing system for doors, trunks, belt lines, hoods, and similar items. The resulting materials are preferably clear and can be processed on conventional thermoplastic equipment. The weatherstripping of this invention have better a weatherability than conventional sulfur-cured EPDM weatherstripping.

In yet another embodiment of this invention, crosslinked substantially linear ethylene polymers are shaped into fibers. These fibers are readily crosslinked upon heating to crosslinking temperatures (at least the decomposition temperature of the crosslinking agent). These elastic fibers have utility in fabricated articles such as woven and non-woven fabric (e.g. washable clothing), elastic string (e.g. woven elastic strap), elastic filters for air/water filtration (e.g. non-woven air cleaners), and fiber mats (e.g. non-woven carpet underlayment).

The crosslinked ethylene polymers, processes for making them, and intermediates for making them of this invention are useful in the automotive area such as fuel tanks, under the hood applications(including gaskets and hoses), industrial goods such as appliance parts (including the housing thereof), building and construction applications such as piping, drain tile, and insulation, electrical (e.g., wire and cable coatings/insulation) and tire products. Some of the fabricated articles include automotive hoses, single ply roofing, and wire and cable voltage insulation and jackets.

One type of shaping and crosslinking is foaming where the polymer is shaped into a foam and crosslinked. Crosslinking is optionally simultaneous with foam formation, after foam forming or a combination thereof where some crosslinking occurs during foam formation and additional crosslinking occurs subsequently. All variations are referred to herein as crosslinking during foaming. Practice of the process of the invention to crosslink polymers during foaming yields crosslinked polymer foams, that is the polymers which have sulfonamide crosslinking between different polymer chains. Crosslinked polyolefins prepared using Ziegler Natta or free radical catalysts, preferably having broad molecular weight distribution, (MWD of 3.5 and greater), foams show larger foam cell size, less homogeneous cell size distribution, lower tensile and compressive strength, and lower toughness than is noted in foams of the corresponding crosslinked polymers made using single site catalysts, preferably having narrow MWD polymer (MWD less than 3.5, preferably about 2.0 or less). The term "crosslinking" is used to refer to foams with gel greater than 10 percent as determined by xylene extraction.

Crosslinked polyolefinic foams, including foams of blends including polyolefins, are used in a variety of applications where cushioning under high or dynamic loading is needed. These foams are usually manufactured using a chemical blowing agent, e.g. azodicarbonamide, in combination with crosslinking induced typically by peroxide decomposition or electron beam irradiation. When exposed to elevated temperature (greater than 130° C.), the blowing agent decomposes into a gas, e.g. nitrogen, and the polyolefinic matrix is crosslinked simultaneously e.g. via peroxide decomposition. By achieving an optimum level of tensile properties at elevated temperatures by crosslinking, the decomposed gas is allowed to expand controllably to produce foams with desirable cell sizes. Crosslinking and blowing of the foam are optionally performed either sequentially or simultaneously. Very small cell size preferably about 100 μm diameter foams are produced via simultaneous crosslinking and blowing agent decomposition under pressure as, for example, in compression or injection molding at elevated temperature.

Those skilled in the art will recognize that foaming processes within the skill in the art which use crosslinking by free radical generating agents are adaptable to crosslinking using poly(sulfonyl azide) and other insertion crosslinking methods.

According to the present invention, one embodiment of a process for making a cross-linked ethylenic polymer foam structure is as follows: First, a foamable melt polymer material is formed by blending and heating a decomposable chemical blowing agent and an ethylenic polymer material. Second, cross-linking is induced in the foamable melt polymer material. Third, the foamable melt polymer material is expanded by exposing it to an elevated temperature to form the foam structure.

The resulting foam structure conveniently is in any physical configuration known in the art, such as sheet, plank, injection molded article or bun stock. Other useful forms are expandable or foamable particles, moldable foam particles, or beads, and articles formed by expansion and/or coalescing and welding of those particles.

Excellent teachings to processes for making ethylenic polymer foam structures and processing them are seen in C. P. Park, "Polyolefin Foam", Chapter 9, Handbook of Polymer Foams and Technology, edited by D. Klempner and K. C. Frisch, Hanser Publishers, Munich, Vienna, New York, Barcelona (1991), which is incorporated herein by reference.

The resulting foam structure is optionally prepared by blending and heating a polyolefin polymer material and a decomposable chemical blowing agent to form a foamable plasticized or melt polymer material, extruding the foamable melt polymer material through a die, inducing crosslinking in the melt polymer material via poly(sulfonyl azide) compound, and exposing the melt polymer material to an elevated temperature to release the blowing agent to form the foam structure. The polymer and the chemical blowing agent are optionally mixed and melt blended by any means known in the art such as with an extruder, mixer, blender, or the like. The chemical blowing agent is preferably dry-blended with the polymer material prior to heating the polymer material to a melt form, but may also be added when the polymer material is in melt phase. Cross-linking is induced by addition of the poly(sulfonyl azide) cross-linking agent. Induction of cross-linking and exposure to an elevated temperature to effect foaming or expansion may occur simultaneously or sequentially. The cross-linking agent is incorporated into the polymer material in the same manner as the chemical blowing agent. Further, the foamable melt polymer material is heated or exposed to a temperature of preferably less than 150° C. to prevent decomposition of the cross-linking agent or the blowing agent and to prevent premature cross-linking. The foamable melt polymer material is extruded or conveyed through a die of desired shape to form a foamable structure. The foamable structure is then cross-linked and expanded at an elevated or high temperature (advantageously, 150° C. –250° C.) such as in an oven to form a foam structure. The present structure can advantageously be made in sheet or thin plank form according to the above process.

The resulting foam structure is optionally made into a continuous plank structure by an extrusion process utilizing a long-land die as described in GB 2,145,961A, which is incorporated herein by reference. In that process, the polymer, decomposable blowing agent and cross-linking agent are mixed in an extruder, heating the mixture to let the polymer cross-link and the blowing agent to decompose in a long-land die; and shaping and conducting away from the foam structure through the die with the foam structure and the die contact lubricated by a proper lubrication material.

The resulting foam structure may also be formed into cross-linked foam beads suitable for molding into articles. To make the foam beads, discrete resin particles such as granulated resin pellets are: suspended in a liquid medium in which they are substantially insoluble such as water; impregnated with a cross-linking agent and a blowing agent at an elevated pressure and temperature in an autoclave or other pressure vessel; and rapidly discharged into the atmosphere or a region of reduced pressure to expand to form the foam beads. A version is that the polymer beads is impregnated with blowing agent, cooled down, discharged from the vessel, and then expanded by heating or with steam. In a derivative of the above process, styrene monomer is optionally impregnated into the suspended pellets along with the cross-linking agent to form a graft interpolymer with the ethylenic polymer material. Blowing agent is optionally impregnated into the resin pellets while in suspension or, alternately, in non-hydrous state. The expandable beads are then expanded by heating with steam and molded by the conventional molding method for the expandable polystyrene foam beads.

The foam beads are optionally then molded by any means within the skill in the art, such as charging the foam beads to the mold, compressing the mold to compress the beads, and heating the beads such as with steam to effect coalescing and welding of the beads to form the article. Optionally, the beads are optionally preheated with air or other blowing agent prior to charging to the mold. Excellent teachings of the above processes and molding methods are seen in C. P. Park, Supra, pp. 227–233, U.S. Pat. Nos. 3,886,100, 3,959,189, 4,168,353, and 4,429,059, which are incorporated herein by reference. The foam beads can also be prepared by preparing a mixture of polymer, cross-linking agent, and decomposable mixtures in a suitable mixing device or extruder and form the mixture into pellets, and heat the pellets to cross-link and expand.

The resulting foam structure is optionally made in bun stock form. The resulting foam structure is optionally made in bun stock form by mixing the polyolefin polymer material, a cross-linking agent, and a chemical blowing agent to form a slab, heat the mixture in a mold so the crosslinking agent can cross-link the polymer material and the blowing agent can decompose, and expand by release of pressure in the mold. Optionally, the bun stock formed upon release of pressure is optionally re-heated to effect further expansion.

Cross-linked polymer sheet is made by heating a polymer sheet containing chemical cross-linking agent. The cross-linked polymer sheet is cut into the desired shapes and impregnated with $N_2$ at a temperature above the softening point of the polymer and a pressure sufficient to result in sufficient impregnation of $N_2$ to result in the preselected foam density; releasing the pressure affects nucleation of bubbles and some expansion in the sheet. Reheat the sheet in a low pressure vessel with pressure above the softening point and release the pressure so that the foam can expand.

Blowing agents useful in making the resulting foam structure include decomposable chemical blowing agents. Such chemical blowing agents decompose at elevated temperatures to form gases or vapors to blow the polymer into foam form. The agent preferably takes a solid form so it is conveniently dry-blended with the polymer material. Chemical blowing agents include azodicarbonamide, azodiisobutyro-nitrile, barium azodicarboxylate, N,N'-dimethyl-N,N'-dinitrosoterephthalamide, N,N'-dinitrosopentamethylenetetramine, benzenesulfonhydrazide, 4,4-oxybenzene sulfonyl semicarbazide, and p-toluene sulfonyl semicarbazide. Azodicarbonamide is preferred. Additional teachings to chemical blowing agents are seen in C. P. Park, Supra, pp. 205–208, and F. A. Shutov, "Polyolefin Foam", Handbook of Polymer Foams and Technology, pp. 382–402, D. Klemper and K. C. Frisch, Hanser Publishers, Munich, Vienna, New York, Barcelona (1991), which is incorporated herein by reference.

The chemical blowing agent is blended with the polymer material in an amount sufficient to evolve advantageously about 0.2 to about 5.0, preferably from about 0.5 to about 3.0, and most preferably from about 1.0 to 2.50 moles of gas or vapor per kilogram of polymer.

In some processes for making the present structure, a physical blowing agent is optionally used. Physical blowing agents include organic and inorganic agents. Advantageous inorganic blowing agents include carbon dioxide, nitrogen, argon, water, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichloro hexafluoropropane.

The amount of blowing agent incorporated into the polymer melt material to make a foam-forming polymer gel is advantageously from about 0.2 to about 5.0, preferably from about 0.5 to about 3.0, and most preferably from about 1.0 to 2.50 moles per kilogram of polymer.

The resulting foam structure has a cross-linked density advantageously of from 5 to 90 percent and more preferably from 30 to 80 percent according to ASTM D-2765–84, method A.

The resulting foam structure advantageously has density of less than 500, more preferably less than 250 and most preferably from about 10 to about 150 kilograms per cubic meter. The foam has an average cell size of from about 0.05 to about 5.0, more preferably from about 0.1 to about 2.0, and most preferably 0.2 to about 1.0 millimeters according to ASTM D3576.

The resulting foam structure is optionally closed cell or open cell according to ASTM D2856-A.

Other components that are optionally added to the foam mixture include fillers such as calcium carbonate, talc, clay, magnesium carbonate, mica, and the like; foaming agent activators including salts of transition metals (especially those of lead, cadmium and zinc) polyols, urea, alcohol amines and organic acids. Zinc oxide and zinc stearate are preferred. Pigments include carbon black, titanium dioxide, cadmium-based or other inorganic or organic based pigments. Foam nucleators include talc, silicon dioxide, titanium dioxide, and clay. Antioxidants e.g. phenolic, phosphitic, etc., can also be included to enhance the shelf-life of the finished article. Process aids such as low molecular weight polyethylene waxes, ester waxes, paraffin wax, paraffin oils, mineral oils, napthenic oils, bisteramides, stearamides, calcium stearate, and stearic acid can also be used. Other additives, e.g. ultraviolet absorbers, flame retardants, etc., can also be included in the polymer mix.

Foams prepared from ethylene copolymers crosslinked according to the practice of the invention exhibit higher tensile, toughness and tear resistance than foams from the same starting material polymers crosslinked with free radical generating crosslinking agents.

The foams are conveniently formed into finished articles by such processes as compression molding, injection molding, extrusion, vertical and horizontal oven expansion, oven-curing, and the like and combinations thereof. When used in combination, the processes are optionally used sequentially or simultaneously as is within the skill in the art.

There are many types of molding operations which can be used to form useful fabricated articles or parts from the formulations disclosed herein, including various injection molding processes (e.g., that described in Modern Plastics Encyclopedia/89, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in Modern Plastics Encyclopedia/89, Mid October 1988 Issue, Volume 65, Number 11, pp. 217–218, "Extrusion-Blow Molding", the disclosure of which is incorporated herein by reference), profile extrusion, calendering, pultrusion and the like.

The following examples are to illustrate this invention and do not limit it. Ratios, parts, and percentages are by weight unless otherwise stated. Examples (Ex) of the invention are designated numerically while comparative samples (C.S.) are designated alphabetically and are not examples of the invention.

Test Methods

Xylene Extraction was performed by weighing out 1 gram samples of polymer. The samples are transferred to a mesh basket which is then placed in boiling xylene for 12 hours. After 12 hours, the sample baskets are removed and placed in a vacuum oven at 150° C. and 28 in. of Hg vacuum for 12 hours. After 12 hours, the samples are removed, allowed to cool to room temperature over a 1 hour period, and then weighed. The results are reported as percent polymer extracted. Percent extracted=(initial weight-final weight)/initial weight according to ASTM D-2765 Procedure "A".

Samples were prepared using either a HaakeBuchler Rheomix 600 mixer with roller style blades, attached to a HaakeBuchler Rheocord 9000 Torque rheometer, or using a Brabender mixer (Type R.E.E. No. A-19/S.B) with a 50 g mixing bowl.

A Perkin Elmer model TMA 7 thermomechanical analyzer was used to measure the upper service temperature (UST). Probe force of 102 g and heating rate of 5° C./min were used. The test specimen was a disk with thickness of about 2 mm and diameter, prepared by melting pressing at 190° C. and air-cooling to room temperature. The UST was taken to be when the probe had penetrated the sample 1.0 mm.

Tensile properties including elongation, break stress, and toughness were determined by compression molding $\frac{1}{16}$ inch plaques. Tensile specimens were then cut from these plaques and tested on an Instron Tensile tester according to ASTMS D-1708, pulled at 5 in/min. This procedure is used in the examples of the invention because it accommodates smaller sample sizes. ASTM 412 is also useful to evaluate tensile properties of larger samples. Results are believed to be comparable, but in the rare instances where they might not be comparable, the values obtained by the procedure of ASTM 412 is preferred for evaluation of the products of the invention.

All instruments were used according to manufacturer's directions.

Samples were prepared using a mixer with roller style blades commercially available from Haake, Inc. under the trade designation HaakeBuchler Rheomix 600 mixer, attached to a rheometer commercially available from Haake, Inc. under the trade designation HaakeBuchler Rheocord 9000 Torque rheometer.

The following materials were used:

Dicumyl Peroxide—Used as received from Hercules Corporation and sold under the trade designation DI-CUP R lot 43HR-233 peroxide.

4,4'-oxybis(benzenesulfonyl azide CAS# [7456-68-0]) This bis(sulfonyl azide) was prepared by the reaction of sodium azide with the corresponding bis(sulfonyl chloride) which is commercially available. Solid sodium azide is added to the acetone solution of the bis(sulfonyl chloride), and the product was isolated by precipitation with excess water.

EXAMPLES 1–3

A 40.0 g sample of a of an ethylene/octene copolymer commercially available from DuPont Dow Elastomers LLC under the trade designation ENGAGE D-8190 (0.858 g/cm$^3$, 0.5MI, 2.0 MWD) was added to a rheometer commercially available from Haake Inc. under the trade designation Haake Rheocord System 9000 Torque Rheometer equipped with a Haake 600 mixing bowl with roller style blades. The bowl temperature was 120° C., and the sample was mixed at 75 rpm. Once the polymer had melted, 0.40 g (1.0 weight percent, 1.05 mmole) of 4,4'-oxybis(benzenesulfonyl azide CAS# [7456-68-0]) was added to the mixing bowl and the run clock was started. The sample was mixed for 8 minutes. The polymer was removed and compression molded at 120° C. for 3 minutes at 20,000 lb of force. After 3 minutes, the sample was removed and placed in a press at 190° C. for 10 minutes during which time the sulfonyl azide reacts to crosslink the polymer. The sample was removed from the press and allowed to cool.

In Example 2, the procedure of Example 1 was repeated using 0.6 g (1.5 weight percent, 1.5 mmole) of 4,4'-oxybis (benzenesulfonyl azide CAS# [7456-68-0]).

In Example 3, the procedure of Example 1 was repeated using 0.8 g (2.0 weight percent, 2.1 mmole) of 4,4'-oxybis (benzenesulfonyl azide CAS# [7456-68-0]). The tensile properties and TMA performance of the samples were measured and are reported in Table 1.

Comparative Samples A–C 40.0 g sample of an ethylene/ octene copolymer commercially available from DuPont Dow Elastomers LLC under the trade designation ENGAGE D-8190 (0.858 g/cm³, 0.5MI, 2.0 MWD) was added to a rheometer commercially available from Haake, Inc. under the trade designation Haake Rheocord System 9000 Torque Rheometer equipped with a mixing bowl commercially available from Haake, Inc. under the trade designation Haake 600 mixing bowl with roller style blades. The bowl temperature was 120° C., and the sample was mixed at 75 rpm. Once the polymer had melted, 0.28 g (0.7 weight percent, 1.05 mmole) of dicumylperoxide was added. The sample was mixed for 5 minutes. The polymer was removed and compression molded at 120° C. for 3 minutes at 20,000 lb of force. After 3 minutes, the sample was removed and placed in a press at 180° C. for 10 minutes during which time the peroxide reacted to crosslink the polymer. The sample was removed from the press and allowed to cool.

For Comparative Sample B, the procedure used for Comparative Sample A was repeated using 0.4 g (1.0 weight percent, 1.5 mmole) of dicumylperoxide.

For Comparative Sample C, the procedure used for Comparative Sample A was repeated using 0.56 g (1.4 weight percent, 2.1 mmole) of dicumylperoxide. The tensile properties and TMA performance of the samples were measured and are recorded in Table 1.

Comparative Sample D

Comparative Sample D is a sample of the same ethylene/octene copolymer commercially available from DuPont Dow Elastomers LLC under the trade designation of ENGAGE D-8190 (0.858 g/cm³, 0.5MI, 2.0 MWD) not crosslinked according to the practice of the invention. The sample was compression molded to make test specimens without going through the mixing process.

Nordel IP NDR 3720 hydrocarbon rubber (0.88 g/cm³, Mooney viscosity 20 (by ASTM D 1646-92), 2.0 MWD) was added to a rheometer commercially available from Haake Inc., under the trade designation Haake Rheocord System 9000 Torque Rheometer equipped with a mixing bowl commercially available from Haake, Inc. under the trade designation Haake 3000 mixing bowl with roller style blades. The ethylene-propylene-diene terpolymer is reportedly made using a single site catalyst. The bowl temperature was 120° C., and the sample was mixed at 20 RPM (revolutions per minute) for 3 min. then increased to 40 RPM for 6 min. after the poly(sulfonyl azide) was added. Once the polymer had melted, 1.0 g (1.0 weight percent) of 4,4'-disulfonylazidophenyl ether was added to the mixing bowl and the run clock was started. The sample was mixed for 8 minutes. The polymer was removed and compression molded at 130° C. for 3 minutes at 20,000 lb of force (88964 Newtons). After 3 minutes, the sample was removed and placed in a press at 190° C. and 300 lb of force (1334 Newtons) for 15 minutes during which time the sulfonyl azide reacted to crosslink the polymer. The sample was removed from the 190° C. press and placed in a 32° C. and 300.00 lb of force (1344 Newtons)press for 6 minutes.

In Example 5, the procedure of Example 4 was repeated using 200.00 g of ethylene-propylene copolymer with Mw/Mn=2.02, Mw=122,00, melt index 1.1 g/10 minutes and density of 0.87 g/cc commercially available from Mitsui Petrochemical Industries under the trade designation Tafmer P0480 polymer. The Tafmer P0480 polymer is reportedly made using a single site catalyst.

In Example 6, the procedure of Example 4 was repeated using an ethylene-octene copolymer with melt index of 1.0 g/10 minutes and density of 0.87 g/cc commercially available from Dupont Dow Elastomers LLC under the trade

TABLE 1

Comparison of Mechanical Properties of Crosslinked Polymer using Azide and Peroxide

| Sample | crosslinking agent (mmole) | UST (° C.) | Peak Stress (psi)** | Peak Stress in Si units** (Mpa) | percent Elongation**** | Toughness in Si units *** (cm-kg/cm³) | Toughness (ln. lb/Cu. in) |
|---|---|---|---|---|---|---|---|
| Example 1 | Azide (1.05) | >190 | 1650 | 11.38 | 850 | 504 | 7200 |
| Example 2 | Azide (1.5) | >190 | 1380 | 9.51 | 820 | 412 | 5880 |
| Example 3 | Azide (2.1) | >190 | 1100 | 7.58 | 570 | 266 | 3800 |
| Comparative Sample A* | Peroxide (1.05) | 95 | 1200 | 8.27 | 930 | 413 | 5900 |
| comparative Sample B* | Peroxide (1.5) | 150 | 1100 | 7.58 | 830 | 347 | 4950 |
| Comparative Sample C* | Peroxide (2.1) | 180 | 730 | 5.03 | 580 | 189 | 2700 |
| Comparative Sample D* | 0 |  | 56 | 910 | 6.27 | 950 | 347 | 4950 |

- *Not examples of the invention.
- ***Toughness is measured by the procedure of ASTM D-1708.
- **Peak Stress is measured by the procedure of ASTM D-1708.
- ****Elongation is measured by the procedure of ASTM D-1708.

The data in Table 1 indicates that at a given molar concentration of crosslinking agent, difunctional sulfonyl azide give improved toughness and improved temperature resistance as measured by TMA compared to peroxide crosslinked samples.

PROCEDURE FOR EXAMPLES 4, 5, AND 6

For Example 4, a 200.0 g sample of a of an ethylene/propylene/diene terpolymer commercially available from DuPont Dow Elastomers LLC under the trade designation designation Engage 8100 polyolefin elastomer which is reportedly made using a single site catalyst.

Procedure for Comparative Sample E

For Comparative Sample E, a 40.0 g sample of an ethylene/propene copolymer commercially available from Exxon Chemical Company under the trade designation Vistalon 707 (0.872 g/cc, 0.5MI g/10 min.) was added to a rheometer commercially available from Haake, Inc. under the trade designation Haake Rheocord System 9000 Torque Rheometer equipped with a mixing bowl commercially available from Haake, Inc. under the trade designation Haake 600 mixing bowl with roller style blades. The bowl temperature was 120° C., and the sample was mixed at 20 rpm. Once the polymer had melted, 1.6 g (4 weight percent) of dicumylperoxide was added. The sample was mixed for 5 minutes. The polymer was removed and compression molded at 138° C. for 1 minutes at 20,000 lb (88964 Newtons) of force into 15.2 cm×15.2 cm×1.27 mm (6 inch×6 in×50 mil) plaques and then cooled immediately on room temperature water cooled platens. These plaques are each cut into four 7.6 cm×7.6 cm×1.27 mm (3 inch×3 inch×50 mil) plaques. These smaller plaques are compression molded at 138° C. for 2 min at 12,000 lb of force (53378 Newtons) into 15.2 cm×15.2 cm×0.51 mm (6 inch×6 inch× 20 mil) plaques and then cooled as described above. The second molding step is done to remove air bubbles. The 15.2 cm×15.2 cm×0.51 mm (6 inch×6 inch×20 mil) was cured at 182° C. for 10 minutes in the press. The tensile properties of the samples were measured.

eroxide on clay commercially available from Hercules Corporation under trade designation DiCup 40 KE peroxide was used in place of the poly(sulfonyl azide).

TABLE 3

Foam Formulation

| Reagent | Weight of reactant for Example 7 | Weight of reactant for Comparative Example F |
|---|---|---|
| Engage 8100 polyolefin elastomer | 1063.9 | 1063.9 |
| Celogen AZ 130 blowing agent | 42.6 | 42.6 |
| Zinc oxide | 10.6 | 10.6 |
| DiCup 40KE peroxide | 0 | 20.2 |
| 4,4'-oxybis (benzenesulfonyl azide) | 10.6 | 0 |

TABLE 2

Properties measured for Examples 4–6 and C.S. E.

| Samples | Resin | UST (C.) | Peak Stress (PSI) | Peak stress (Mpa) | Elongation (percent) | Toughness (in-lb/in$^3$) | Toughness (cm-kg/cm$^3$) |
|---|---|---|---|---|---|---|---|
| Ex. 4 | Tafmer 0480 polymer | >190 | 978 | 6.74 | 978 | 6180 | 433 |
| Ex. 5 | Nordel IP 3720 polymer | >190 | 1510 | 10.48 | 1016 | 6660 | 466 |
| EX. 6 | Engage 8100 polyolefin elastomer | >190 | 1889 | 13.02 | 794 | 6948 | 486 |
| C.S. E | Vistalon 707 polymer | N/M* | 690 | 4.75 | 630 | 2700 | 189 |

*N/M means not measured

The results in Table 3 indicate that a variety of elastomers prepared using single site catalysts can be crosslinked using poly(sulfonyl azide). The toughness is higher for a polymer made using a single site catalyst crosslinked according to the practice of the invention than the corresponding (similar density and melt index) Ziegler Natta catalyzed polymer using peroxide as a curing agent (C. S. E).

EXAMPLE 7 AND COMPARATIVE SAMPLE F

Procedure of Mixing the Reagents

In Example 7 an ethylene-octene copolymer with melt index of 1.0 g/10 min. and density of 0.87 g/cc commercially available from Dupont Dow Elastomers LLC under the trade designation Engage 8100 polyolefin elastomer, azodicarboamide blowing agent commercially available from Uniroyal Chemical Company under the trade designation Celogen AZ 130 blowing agent, zinc oxide blowing agent activator commercially available from C.P. Hall Chemical Inc. were used. The Engage 8100 polyolefin elastomer, Celeogen AZ 130 blowing agent, and zinc oxide were weighed out and mixed in a mixer commercially available from Farrel Corporation under the trade designation Banbary BR at 100° C.–120° C. for 3 minutes. 4,4'-oxybis(benzenesulfonyl azide) CAS# [7456-68-0]) was added and mixed for an additional 3 minutes. The mixture was then sheeted off on a roll mill heated to 80° C. into a ¼ inch thick (0.63 cm) slab.

The method of Example 7 was repeated for Comparative Sample F except that 20.2 g of 40 percent active dicumylp- Procedure for Making Foam for Example 7

The resulting roll milled slab was cut to approximately 0.25×0.25×0.25 inch (0.635×0.635×0.635 cm) cubic pieces. About 12 grams of these cut pieces were then weighed and placed into a chase (a mold frame) with an opening of 1 inch (2.54 cm) in diameter and ¼ inch (0.635 cm) in thickness. The mold frame was then put into a compression molding press at 120° C. with 25,000 pounds (111,205 Newtons) of applied pressure for 20 minutes. The plaque was then foamed at 180° C. with applied pressure of 50,000 pounds force (222,410 Newtons) for 7 minutes. The press was opened and the foam expanded.

Procedure for Making Foam for Comparative Sample F

The procedure of Example 7 was repeated except that the slab resulting from Comparative Sample F was used and the foaming temperature was 160° C. for 9 minutes instead of 180° C. for 7 minutes. The foam density was measured at 20° C. according to ASTM D 792–86 using isopropanol as a liquid medium. The foam cell size was determined by scanning electron microscopy.

TABLE 4

Properties of Foams of
Examples 7 and Comparative Sample F

| Sample | Foam Density (lb/ft3) | Foam Density (kg/m$^3$) | Cell size (mm) |
|---|---|---|---|
| Example 7 | 8.39 | 136 | 0.175 |
| Comparative Sample. F | 9.96 | 161 | 0.375 |

A good quality foam of low density (8.39 lb/ft$^3$) (136 kg/m$^3$) and small cell size (0.175 mm diameter) was achieved using the poly(sulfonyl azide) in Example 7. The foam was very flexible, tough, and resilient (based on squeezing, bending and tearing the sample by hand).

The data in Table 4 indicates that the foam made from elastomer prepared using a single site catalyst and a poly (sulfonyl azide) crosslinking agent according to the practice of the invention has much smaller cell size than the corresponding Comparative Sample F crosslinked using peroxide. The lower cell size foam of Example 7 has more desirable foam properties such as lower hardness measured according to the procedures of ASTM D2240-91, higher tear strength measured according to the procedures of ASTM D-3574 (Test F), higher tensile strength and higher elongation measured according to the procedures of ASTM D-1708, and lower compression set measured according to the procedures of ASTM D-395 (50° C., 50 percent compression, 6 hours) than the foam with large cell size of Comparative Sample F. The foam of Comparative Sample F also has undesirable odor believed to result from decomposition products of peroxide. The foam of Example 7, in contrast, is odor free which is desirable for foot wear foam, building construction foam, car interior foams, and the like.

EXAMPLE 8 AND COMPARATIVE SAMPLE G

The procedure of Example 7 was repeated for Example 8 except that a large slab sample (185 g) and a chase with an opening of 6×6×0.5 inch (0.15×0.15×0.013 m) were used.

The procedure of Comparative Sample F was repeated for Comparative Sample G except the a large slab sample (185 g) and a chase with an opening of 6×6×0.5 (0.15×0.15× 0.013 m) inch were used. Properties of the foams of Example 8 and Comparative Sample G were measured and are recorded in Table 5.

TABLE 5

Properties of Foams of
Example 8 and Comparative Sample G

| Properties Foam | Example 8 | Example 8 | Comparative Sample G | Comparative Sample G |
|---|---|---|---|---|
| Density ASTM D 792-86 | 7.1 lb/ft$^3$ | 114 kg/m$^3$ | 8.29 lb/ft$^3$ | 133 kg/m$^3$ |
| Asker C Hardness ASTM D2240-91 | 25 | | 30 | |
| Resilience ASTM D 3574-86 (Test H) | 67 percent | | 59 percent | |
| Ultimate strength ASTM D 1708 | 217 psi | 1.496 Mpa | 215 psi | 1.482 Mpa |
| Elongation at break ASTMD 1708 | 732 percent | | 670 percent | |
| Toughness ASTM D 1708 | 425 in-lb/cu in | 29.7 cm-kg/cm$^3$ | 383 in-lb/cu. In | 26.8 cm-kg/cm$^3$ |

The data in Table 5 indicates that the foam made from an elastomer prepared using a single site catalyst and a poly (sulfonyl azide) crosslinking agent according to the practice of the invention has a lower hardness (is more flexible), a lower density, a higher toughness, and a higher resiliency than the corresponding Comparative Sample G crosslinked using peroxide.

What is claimed is:

1. A process comprising (a) forming a polymeric admixture including at least one polyolefin having a molecular weight distribution less than about 3.5 which has been prepared using a single site catalyst and at least a crosslinking amount of at least one poly(sulfonyl azide) crosslinking agent; (b) shaping the resulting admixture; and (c) heating the resulting shaped admixture to a temperature at least the decomposition temperature of the crosslinking agent such that the crosslinking agent crosslinks the polymer admixture wherein the polymeric admixture crosslinked with a poly (sulfonyl azide) crosslinking agent has improved toughness and improved temperature resistance as measured by thermomechanical analysis (TMA) compared to the same polymeric admixture crosslinked with the same molar concentration of a peroxide crosslinking agent.

2. The process of claim 1 wherein in step (b) the polymeric admixture is in a softened or melted condition for shaping.

3. The process of claim 1 wherein step (b)comprises thermoforming, compression molding, injection molding, extrusion, casting, blow molding, blowing, profile extrusion, spinning, other molding or combination thereof.

4. The process of claim 1 wherein step (c) comprises foaming.

5. The process of claim 1 wherein step (a) includes forming a foamable melt polymer material by admixing and heating a decomposable chemical blowing agent and other components of the polymeric admixture; and step (b) includes extruding the foamable melt polymer material through a die.

6. The process of claim 1 wherein step (a) comprises the substeps of (i) suspending discrete polyolefin particles in a liquid medium in which they are insoluble, (ii) impregnating the particles with a crosslinking amount of poly(sulfonyl azide) crosslinking agent and a blowing agent at a superatmospheric pressure and temperature above the softening point of the polymer; and step (b), (c) or a combination thereof includes (iii) rapidly discharging the particles into a pressure less than that in substep (ii) to form foam beads or (iv) cooling the particles and subsequently expanding them with at least one heated gas.

7. The process of claim 1 wherein step (a) includes admixing at least one polyolefin, a crosslinking amount of a poly(sulfonyl azide) crosslinking agent, and a chemical blowing agent to form an admixture; step (b) comprises a first substep forming a slab of the admixture; step (c) includes heating the admixture in a mold such that the crosslinking agent crosslinks the polymer material and the blowing agent decomposes; and either step (b), step (c) or a combination thereof includes expanding the slab formed in the first substep of step (b) by releasing pressure in the mold.

8. The process of claim 1 wherein step (b) comprises a first substep of forming a sheet of the polymeric admixture containing a crosslinking amount of poly(sulfonyl azide) crosslinking agent; step (c) comprises heating the sheet sufficiently to result in crosslinking; step (b) further includes a second substep of impregnating the sheet with $N_2$ at a temperature above the softening point of the polymer and at a pressure and a third substep of releasing the pressure to result in nucleation of bubbles and some expansion in the sheet.

9. The process of claim 8 additionally comprising an additional substep of step (b) between forming the sheet and releasing pressure of cutting the sheet into a predetermined shape.

10. The process of claim 1 wherein the crosslinking agent is introduced into the polymeric admixture in melt processing equipment.

11. The process of claim 10 wherein the melt processing equipment is an extruder.

12. The process of claim 1 wherein the single site catalyst is a constrained geometry or metallocene catalyst.

13. The process of claim 1 wherein at least one polyolefin is a polyethylene homopolymer.

14. The process of claim 1 wherein at least one polyolefin is an ethylene copolymer also having at least one alpha olefin comonomer selected from monomers of from 3 to 20 carbon atoms.

15. The process of claim 1 wherein at least one polyolefin is an elastomeric polymer.

16. The process of claim 1 wherein at least one polyolefin is an ethylene/alpha olefin/diene terpolymer or interpolymer.

17. The process of claim 1 wherein at least one polyolefin is a substantially linear ethylene polymer.

18. The process of claim 4, wherein the foaming results in a smaller cell size compared to the same polymeric admixture crosslinked with the same molar concentration of a peroxide crosslinking agent.

19. The process of claim 1 wherein the polymeric admixture is a blend comprising at least about 5 weight percent of least one polyolefin made using a single site catalyst and at least one other polymer which differs from the polyolefin by having a different density, a different molecular weight, a different catalyst used in polymerization, a different chemical composition or combination thereof.

20. The process of claim 19 wherein the polyolefin made using a single site catalyst is present in an amount of at least about 10 weight percent of the blend, is a polyethylene or an ethylene alpha olefin copolymer and the other polymer differs in density, in molecular weight (Mn) by the larger molecular weight being at least about 10 percent greater than the lesser, or is selected from the group consisting of ethylene vinyl acetate copolymer, styrene diene block copolymers, natural rubber, isoprene rubber or a combination thereof.

21. The process of claim 19 wherein all polyolefins in the blend have a molecular weight distribution less than about 3.5.

22. The process of claim 1 wherein at least one poly(sulfonyl azide) has a structure X—R—X wherein each X is $SO_2N_3$ and R represents an unsubstituted or inertly substituted hydrocarbyl, hydrocarbyl ether or silicon-containing group; wherein the poly(sulfonyl azide) has at least 3 and less than about 50 carbon, silicon or oxygen atoms between sulfonyl azide groups; and wherein R includes at least one aryl group between the sulfonyl groups.

23. The process of claim 1 wherein the poly(sulfonyl azide) is present in an amount greater than about 0.5 weight percent based on the total weight total polymeric admixtures and wherein the crosslinking agent and polyolefin react at a temperature at least the decomposition temperature and greater than about 185° C.

* * * * *